(12) United States Patent
Kim et al.

(10) Patent No.: US 12,004,253 B2
(45) Date of Patent: *Jun. 4, 2024

(54) METHOD AND APPARATUS FOR SEGMENTING RADIO RESOURCE CONTROL MESSAGE IN NEXT-GENERATION MOBILE COMMUNICATION SYSTEM

(71) Applicant: SAMSUNG ELECTRONICS CO., LTD., Suwon-si (KR)

(72) Inventors: Donggun Kim, Suwon-si (KR); Soenghun Kim, Suwon-si (KR); Himke Van Der Velde, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

This patent is subject to a terminal disclaimer.

(21) Appl. No.: 17/662,541

(22) Filed: May 9, 2022

(65) Prior Publication Data

US 2022/0264693 A1 Aug. 18, 2022

Related U.S. Application Data

(63) Continuation of application No. 16/718,009, filed on Dec. 17, 2019, now Pat. No. 11,330,661.

(30) Foreign Application Priority Data

Dec. 17, 2018 (KR) .................. 10-2018-0163435

(51) Int. Cl.
*H04L 47/36* (2022.01)
*H04L 47/43* (2022.01)
(Continued)

(52) U.S. Cl.
CPC ............ *H04W 76/27* (2018.02); *H04L 47/36* (2013.01); *H04L 47/43* (2022.05); *H04L 69/166* (2013.01);
(Continued)

(58) Field of Classification Search
CPC ..... H04L 47/43; H04L 69/166; H04L 47/365; H04L 47/628; H04L 47/36; H04L 69/321; H04L 29/06136; H04W 28/06
See application file for complete search history.

(56) References Cited

U.S. PATENT DOCUMENTS 11,330,661 B2 * 5/2022 Kim ..................... H04L 47/36
2010/0177733 A1 7/2010 Yi et al.
(Continued)

FOREIGN PATENT DOCUMENTS

WO 2019/017583 A1 1/2019

OTHER PUBLICATIONS

3GPP, "TS 36.323 v15.1.0", Sep. 2018, pp. 1-51 (Year: 2018).*
(Continued)

*Primary Examiner* — Salvador E Rivas

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present disclosure relates to a method of segmenting data by a transmitting side in a mobile communication system. The method includes: determining whether a size of a RRC (radio resource control) message exceeds a maximum PDCP (packet data convergence protocol) SDU (service data unit) size; when the size of the RRC message exceeds the maximum PDCP SDU size, performing a segmentation of the RRC message into a plurality of segments in a RRC layer;
(Continued)

and transmitting, to a base station (BS), the plurality of segments of the RRC message.

14 Claims, 18 Drawing Sheets

(51) Int. Cl.
  *H04L 69/166* (2022.01)
  *H04L 69/22* (2022.01)
  *H04W 76/27* (2018.01)
  *H04B 7/0413* (2017.01)
  *H04L 69/321* (2022.01)

(52) U.S. Cl.
  CPC ............ *H04L 69/22* (2013.01); *H04B 7/0413* (2013.01); *H04L 69/321* (2013.01)

(56) References Cited

U.S. PATENT DOCUMENTS

| | | | | |
|---|---|---|---|---|
| 2010/0296464 | A1* | 11/2010 | Barraclough | H04M 15/00 370/329 |
| 2016/0308776 | A1* | 10/2016 | Ozturk | H04L 47/365 |
| 2017/0222871 | A1 | 8/2017 | Yu et al. | |
| 2018/0192308 | A1 | 7/2018 | Yi et al. | |
| 2019/0104432 | A1* | 4/2019 | Dhanapal | H04W 76/50 |
| 2020/0146093 | A1* | 5/2020 | Zhang | H04L 5/0053 |

OTHER PUBLICATIONS

R2-1815006, "Support segmentation and concatenation on RRC message transmission", Oct. 8-12, 2018, pp. 1-6 (Year: 2018).*
R2-1817648, "Segmentation of UE Radio Capability information", Nov. 12-16, 2018, pp. 1-3 (Year: 2018).*
Ericsson et al., "Segmentation in DL", 3GPP TSG-RAN WG2 #108, Nov. 18-22, 2019, R2-1915762, 4 pages.
Office Action dated Mar. 16, 2022 in connection with India Patent Application No. 202137031404, 6 pages.
Apple, "Huge RRC message transmission", 3GPP TSG-RAN WG2 Meeting #103bis, Oct. 8-12, 2018, R2-1815005, 3 pages.
Oppo, "Discussion on UE Capability Segmentation", 3GPP TSG-RAN2 Meeting #104, Nov. 12-16, 2018, R2-1816464, 2 pages.
Huawei, HiSilicon, "Segmentation of UE Radio Capability information", 3GPP TSG-RAN2 Meeting #104, Nov. 12-16, 2018, R2-1817648, 3 pages.
Apple, "Support segmentation and concatenation on RRC message transmission", 3GPP TSG-RAN WG2 Meeting #103bis, Oct. 8-12, 2018, R2-1815006, 6 pages.
International Search Report dated Apr. 17, 2020 in connection with International Patent Application No. PCT/KR2019/017893, 3 pages.
Written Opinion of the International Searching Authority dated Apr. 17, 2020 in connection with International Patent Application No. PCT/KR2019/017893, 4 pages.
3GPP, "TS 36.323", Sep. 2018, v15.1.0, pp. 1-51 (Year: 2018).
Office Action dated Sep. 27, 2023, in connection with Chinese Patent Application No. CN201980083691.7, 14 pages.
Communication pursuant to Article 94(3) EPC dated Nov. 2, 2023, in connection with European Patent Application No. EP19900867.3, 7 pages.
Hearing Notice issued Dec. 14, 2023, in connection with Indian Patent Application No. 202137031404, 3 pages.

* cited by examiner

METHOD AND APPARATUS FOR SEGMENTING RADIO RESOURCE CONTROL MESSAGE IN NEXT-GENERATION MOBILE COMMUNICATION SYSTEM

CROSS-REFERENCE TO RELATED APPLICATIONS

This application is a continuation of application Ser. No. 16/718,009, filed Dec. 17, 2019, now U.S. Pat. No. 11,330,661, issued May 10, 2022, which is based on and claims priority under 35 U.S.C. 119 to Korean Patent Application No. 10-2018-0163435 filed on Dec. 17, 2018 in the Korean Intellectual Property Office, the disclosures of which are herein incorporated by reference in their entirety.

BACKGROUND

1. Field

The disclosure relates to a next-generation mobile communication system and, more particularly, to a method or an apparatus for segmenting a Radio Resource Control (RRC) message in a next-generation mobile communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a next-generation mobile communication system such as a 5G communication system or a pre-5G communication system, an eNB provides a service to a user equipment (UE) on the basis of beams and supports more functions, and thus a radio resource control (RRC) message should include beam-related configuration information configured in the UE and configuration information of many functions and accordingly the size of the RRC message may become larger.

Further, data received from a higher layer has a maximum size that can be processed by a packet data convergence protocol (PDCP) layer device. For example, in the next-generation mobile communication system, the PDCP layer device may support a maximum of 9-kilobyte size for one data packet. Accordingly, if the size of an RRC message received from an RRC layer or user layer data received from a higher layer such as a transmission control protocol/internet protocol (TCP/IP) or user datagram protocol (UDP) layer is larger than the maximum data size supported by the PDCP layer device (for example, 9 kilobytes), the PDCP layer device cannot process the data.

The above information is presented as background information only to assist with an understanding of the disclosure. No determination has been made, and no assertion is made, as to whether any of the above might be applicable as prior art with regard to the disclosure.

SUMMARY

The disclosure provides a method and an apparatus for segmenting an RRC message or user layer data in a next-generation mobile communication system on the basis of the above-described problem.

In accordance with an aspect of the disclosure, a method of segmenting data by a user equipment (UE) is provided. The method includes: determining whether a size of a RRC (radio resource control) message exceeds a maximum PDCP (packet data convergence protocol) SDU (service data unit) size; when the size of the RRC message exceeds the maximum PDCP SDU size, performing a segmentation of the RRC message into a plurality of segments in a RRC layer; and transmitting, to a base station (BS), the plurality of segments of the RRC message.

In accordance with another aspect of the disclosure, a method of reassembling data by a BS is provided. The method includes: transmitting, to a user equipment (UE), a UE capability enquiry message comprising an indicator indicating whether a segmentation of a RRC (radio resource control) message into a plurality of segments is allowed; and receiving, from the UE, a plurality of segments of the RRC message, wherein the segmentation of the RRC message is performed based on the indicator.

In accordance with another aspect of the disclosure, a UE is provided. The UE includes: a transceiver; and at least one processor coupled with the transceiver, wherein the at least one processor configured to: determine whether a size of a RRC (radio resource control) message exceeds a maximum PDCP (packet data convergence protocol) SDU (service data unit) size; when the size of the RRC message exceeds the maximum PDCP SDU size, perform a segmentation of the RRC message into a plurality of segments in a RRC layer; and transmit, to a base station (BS), the plurality of segments of the RRC message.

An apparatus and a method according to various embodiments of the disclosure can segment data and allow a packet data convergence protocol (PDCP) layer device to process the data, the data having a large size that cannot be processed by the PDCP layer.

Effects which can be acquired by the disclosure are not limited to the above described effects, and other effects that have not been mentioned may be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
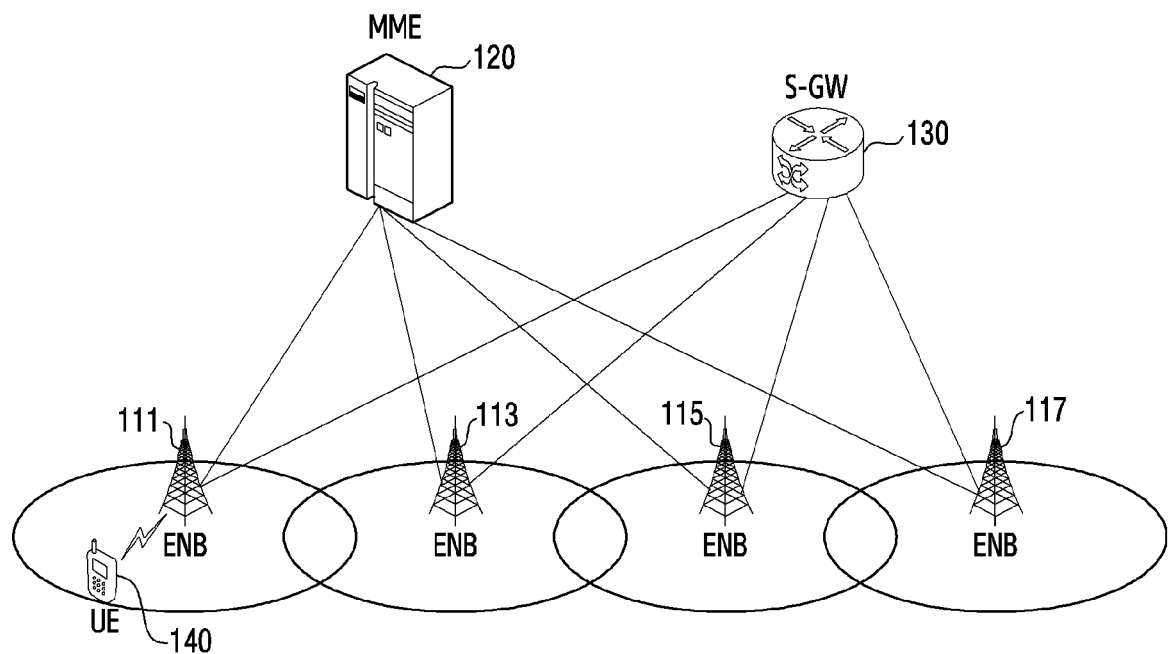
FIG. 1 illustrates a structure of an LTE system to which various embodiments of the disclosure can be applied.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, eve the terms defined herein may not be construed to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification.

In the following description, terms for identifying an access node, terms referring to network entities, terms referring to messages, terms referring to interfaces between network entities, and terms referring to various pieces of identification information are used for convenience of description. Therefore, the disclosure may not be limited by the terminologies provided below, and other terms that indicate subjects having equivalent technical meanings may be used.

For convenience of description, the disclosure uses terms and names defined in a $3^{rd}$ generation partnership project long term evolution (3GPP LTE) standard. However, the disclosure is not limited to the terms and the names, and may be equally applied to systems that comply with other standards. In the disclosure, for convenience of description, an eNB is interchangeable with a gNB. That is, a base station described as an eNB may indicate a gNB.

In a next-generation mobile communication system, a packet data convergence protocol (PDCP) layer device determines a size of one piece of data which can be processed. For example, a maximum of 9 kilobytes can be supported. Accordingly, when the size of a radio resource control (RRC) message received from an RRC layer or user layer data received from a higher layer such as a transmission control protocol/internet protocol (TCP/IP) layer or a user datagram protocol (UDP) layer is larger than the maximum size (for example, 9 kilobytes) supported by the PDCP layer device, the PDCP layer device cannot process the data.

When the size of an RRC message received from an RRC layer or user layer data received from a higher layer such as a TCP/IP or UDP layer is larger than the maximum size (for example, 9 kilobytes) supported by the PDCP layer device, the disclosure proposes a method of segmenting the RRC message or the user layer data or a method of reassembling the same.

The method of segmenting data or the method of reassembling the same proposed by the disclosure may define a new indicator (for example, a 1-bit or 2-bit indicator or a serial number) and segment or reassemble data by an RRC layer device, a PDCP layer device, a Service Data Adaptation Protocol (SDAP) layer device, or a newly defined layer device on the basis of the indicator. Further, the method of segmenting data or the method of reassembling the same proposed by the disclosure may be applied only to an RRC message or a control data bearer (Signaling Radio Bearer (SRB)).

In the disclosure, a base station defines the indicator indicating or configuring the method of segmenting or reassembling the RRC message (or data) to an RRC layer device, a PDCP layer device, an SDAP layer device, or a newly defined layer device through the RRC message and indicates or configures the indicator, and the RRC message may be a UE capability report request message (UEInformationEnquiry), an RRC connection configuration message (RRCSetup), an RRC connection resume message (RRCResume), an RRC configuration message (RRCReconfiguration), or a newly defined RRC message. When receiving the indicator of the RRC message, on the basis of the indicator, the UE may reassemble RRC messages (or data) segmented or transmitted by an RRC layer device, a PDCP layer device, an SDAP layer device, or a newly defined layer device or received data according to the RRC message (or data) segmentation or reassembly method.

An RRCSetupRequest message, an RRCSetup message, an RRCSetupComplete message, an RRCResumeRequest message, an RRCResume message, an RRCResumeComplete message, an RRCReconfiguration message, a UEInformationEnquiry message, a UECapabilityInformation message, an RRCReestablishment message, or an RRCReestablishmentComplete message described below in the disclosure may be an example of the RRC message, and an indicator proposed by the disclosure may be defined in and used for the RRC messages.

FIG. 1 illustrates a structure of an LTE system to which various embodiments of the disclosure can be applied.

Referring to FIG. 1, a radio access network of the LTE system includes next generation Evolved Node Bs (hereinafter, referred to as ENBs, an Node Bs, or base stations) 111, 113, 115 and 117, a Mobility Management Entity (MME) 120, and a Serving-Gateway (S-GW) 130. A User Equipment 140 (hereinafter, referred to as a UE or a terminal) accesses an external network through the ENBs 111, 113, 115, and 117 and the S-GW 130.

In FIG. 1, the ENBs 111, 113, 115, and 117 may correspond to conventional Node Bs of a Universal Mobile Telecommunication System (UMTS). The ENB is connected to the UE 140 through a radio channel, and may perform a more complicated role than the conventional node B. In the LTE system, since all user traffic including a real time service such as a Voice over IP (VoIP) through an Internet protocol are serviced through a shared channel, an apparatus for collecting and scheduling status information on buffer statuses of UEs, available transmission power status, and channel statuses is required, and the ENBs 111, 113, 115, and 117 serve as this apparatus. One ENB may generally control a plurality of cells. For example, in order to implement a transmission rate of 100 Mbps, the LTE system may use Orthogonal Frequency Division Multiplexing (OFDM) as a radio access technology in a bandwidth of 20 MHz. Further, an Adaptive Modulation and Coding (hereinafter, referred to as an AMC) scheme of determining a modulation scheme and a channel coding rate may be applied in correspondence to a channel status of the UE. The S-GW 130 is a device for providing a data bearer and may generate or remove a data bearer under the control of the MME 120. The MME 120 is a device for performing various control functions as well as a function of managing mobility of the UE 140 and may be connected to a plurality of ENBs.

Figure 2:
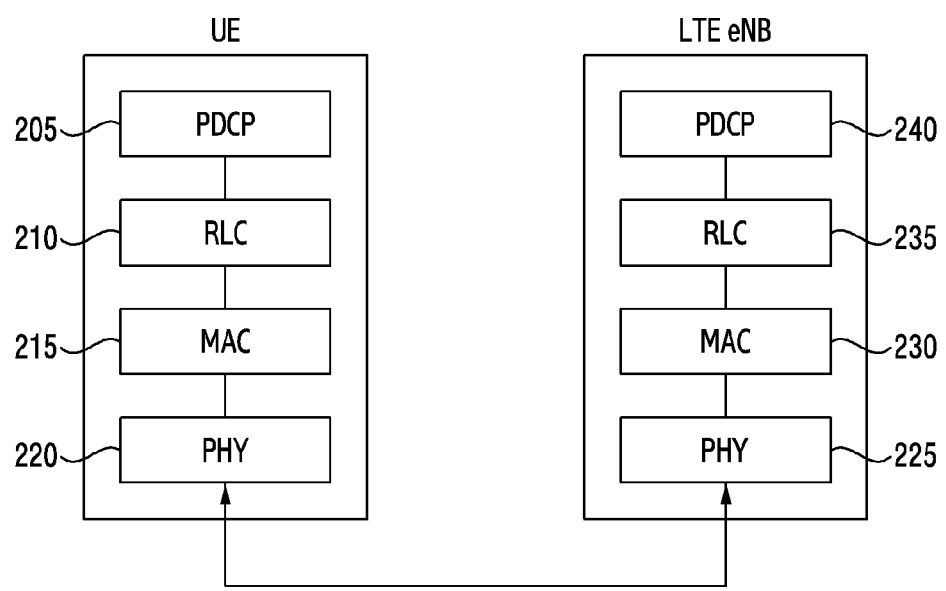
FIG. 2 illustrates a radio protocol structure in the LTE system to which various embodiments of the disclosure can be applied.

FIG. 2 illustrates a radio protocol structure in the LTE system to which various embodiments of the disclosure can be applied.

Referring to FIG. 2, the radio protocol of the LTE system may include PDCP layers 205 and 240, Radio Link Control (RLC) layers 210 and 235, and Medium Access Control (MAC) layers 215 and 230 in the UE 140 and the ENB 111, 113, 115, or 117, respectively. The PDCP layers 205 and 240 may perform an operation of compressing/reconstructing an IP header. A main function of the PDCP layers 205 and 240 may be as shown in [Table 1] below.

TABLE 1

| Function | Operation |
| --- | --- |
| Header compression or decompression function | Header compression and decompression: Robust Header Compression (ROHC) only |
| User data transmission function | Transfer of user data |
| Sequential delivery function | In-sequence delivery of upper layer Protocol Data Units (PDUs) in PDCP re-establishment procedure for RLC Acknowledged Mode (AM) |
| Reordering function | For split bearers in Dual Connectivity (DC) (only support for RLC AM): PDCP PDU routing for transmission and PDCP PDU reordering for reception |
| Duplicate detection function | Duplicate detection of lower layer SDUs in PDCP re-establishment procedure for RLC AM |
| Retransmission function | Retransmission of PDCP SDUs at handover and, for split bearers in DC, of PDCP PDUs in PDCP data-recovery procedure, for RLC AM |
| Ciphering or deciphering function | Ciphering or deciphering |
| Timer-based Service Data Unit (SDU) removal function | Timer-based SDU discard in uplink |

The RLC layers 210 and 235 may reconfigure the PDCP Packet Data Unit (PDU) to be the proper size and perform an automatic repeat request (ARQ) operation. The main functions of the RLC layers 210 and 235 are as shown in [Table 2] below.

TABLE 2

| Function | Operation |
| --- | --- |
| Data transmission function | Transfer of upper layer PDUs |
| ARQ function | Error Correction through ARQ (only for AM data transfer) |
| Concatenation, segmentation, and reassembly function | Concatenation, segmentation and reassembly of RLC SDUs (only for UM and AM data transfer) |
| Re-segmentation function | Re-segmentation of RLC data PDUs (only for AM data transfer) |
| Reordering function | Reordering of RLC data PDUs (only for UM and AM data transfer |
| Duplicate detection function | Duplicate detection (only for UM and AM data transfer) |
| Error detection function | Protocol error detection (only for AM data transfer) |
| RLC SDU deletion function | RLC SDU discard (only for UM and AM data transfer) |
| RLC re-establishment function | RLC re-establishment |

The MAC layers 215 and 230 may be connected with various RLC layer devices 210 and 235 included in the UE 140, and may perform an operation for multiplexing RLC PDUs to the MAC PDU and de-multiplexing the RLC PDUs from the MAC PDU. The main functions of the MAC layers 215 and 230 are as shown in [Table 3] below.

TABLE 3

| Function | Operation |
| --- | --- |
| Mapping function | Mapping between logical channels and transport channels |
| Multiplexing or demultiplexing function | Multiplexing/demultiplexing of MAC SDUs belonging to one or different logical channels into/from transport blocks (TB) delivered to/from the physical layer on transport channels |
| Scheduling information report function | Scheduling information reporting |
| HARQ function | Error correction through Hybrid automatic repeat request (HARQ) |
| Logical channel priority control function | Priority handling between logical channels of one UE |
| UE priority control function | Priority handling between UEs by means of dynamic scheduling |
| MBMS service identification function | MBMS service identification |

TABLE 3-continued

| Function | Operation |
|---|---|
| Transport format selection function | Transport format selection |
| - Padding function | Padding |

The physical layers 220 and 225 perform an operation for channel-coding and modulating higher layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 3:
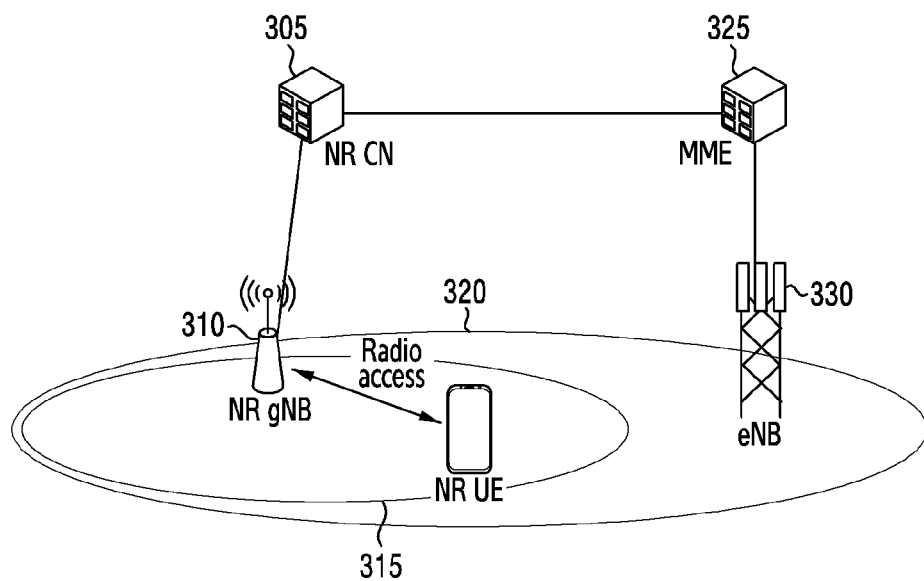
FIG. 3 illustrates a structure of the next-generation mobile communication system to which various embodiments of the disclosure can be applied.

FIG. 3 illustrates a structure of the next-generation mobile communication system to which various embodiments of the disclosure can be applied.

Referring to FIG. 3, a radio access network of a next-generation mobile communication system (hereinafter, Next Radio (NR) or 5th Generation (5G)) may include a new radio node B 310 (hereinafter, referred to as an NR gNB or NR base station) and a New Radio Core Network 305 (NR CN). A user terminal 315 (hereinafter, referred to as a New Radio User Equipment (NR UE) or a terminal) may access an external network through the NR gNB 310 or the NR CN 305.

In FIG. 3, the NR gNB 310 may correspond to an evolved Node B (eNB) in a conventional LTE system. The NR gNB 310 may be connected to the NR UE 315 through a radio channel and may provide better service than the conventional node B. Since all user traffic is served through a shared channel in the next-generation mobile communication system, a device for collecting and scheduling status information of buffer statuses, available transmission power statuses, and channel statuses of NR UEs is required, which corresponds to the NR gNB 310. One NR gNB 310 may generally control a plurality of cells. The NR gNB may have a bandwidth wider than the conventional maximum bandwidth in order to implement super-high-speed data transmission compared to conventional LTE and may apply Orthogonal Frequency Division Multiplexing (OFDM) through radio access technology and further apply beam-forming technology. Further, an Adaptive Modulation and Coding (hereinafter, referred to as an AMC) scheme of determining a modulation scheme and a channel coding rate in correspondence to a channel status of the NR UE may be applied. The NR CN 305 may perform a function of supporting mobility, configuring a bearer, and configuring QoS. The NR CN 305 is a device for performing various control functions as well as a function of managing mobility of the NR UE and may be connected to a plurality of NR gNBs. Further, the next-generation mobile communication system may be linked to the conventional LTE system, and the NR CN 305 may be connected to an MME 325 through a network interface. The MME 325 may be connected to an eNB 330 which is a conventional base station.

Figure 4:
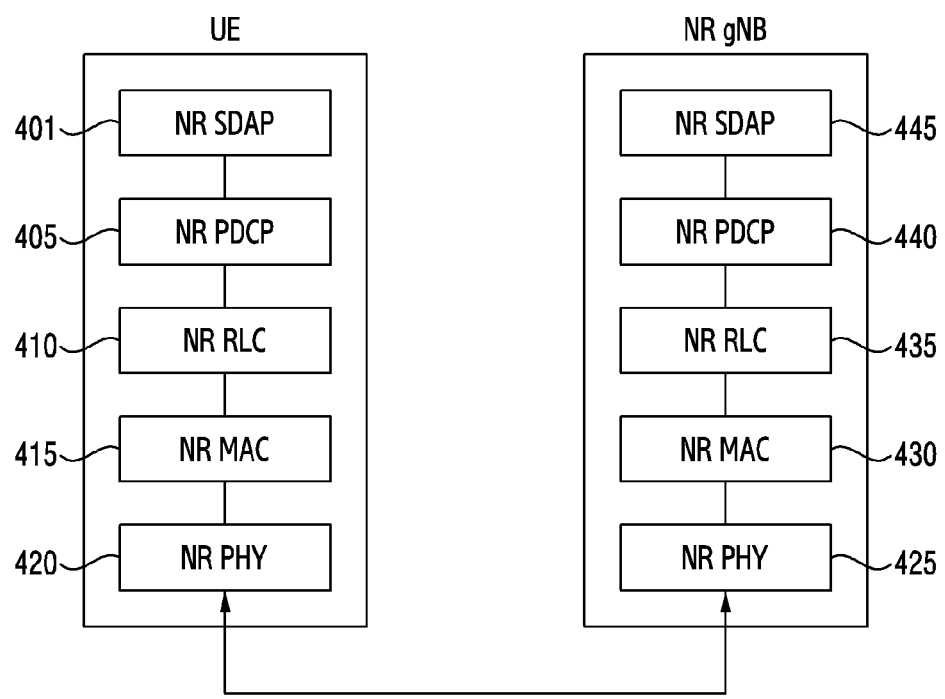
FIG. 4 illustrates a structure of a radio protocol in the next-generation mobile communication system to which various embodiments of the disclosure can be applied.

FIG. 4 illustrates a structure of a radio protocol in the next-generation mobile communication system to which various embodiments of the disclosure can be applied.

Referring to FIG. 4, the radio protocol of the next-generation mobile communication system may include NR SDAP layers 401 and 445, NR PDCP layers 405 and 440, NR RLC layers 410 and 435, and NR MAC layers 415 and 430 in the NR UE 315 and the NR gNB 310, respectively.

The main functions of the NR SDAP layers 401 and 445 may include some of the following functions.
  User data transmission function
  Function of mapping QoS flow and data bearer in uplink and downlink
  Function of making QoS flow ID in uplink and downlink
  Function of mapping reflective QoS flow to data bearer for uplink SDAP PDUs With respect to the NR SDAP layer devices 401 and 445, the NR UE 310 may receive a configuration of whether to use a header of the SDAP layer device for each PDCP layer device, for each bearer, or for each logical channel or whether to use a function of the SDAP layer device through an RRC message. If the SDAP header is configured, a 1-bit indicator configured to reflect a NAS QoS of the SDAP header (NAS reflective QoS) and a 1 bit-indicator configured to reflect an AS QoS (AS reflective QoS) may indicate that the NR UE 310 updates or reconfigures information on mapping of QoS flow and a data bearer in uplink and downlink. The SDAP header may include QoS flow ID information indicating the QoS. QoS information may be used as data processing priority and scheduling information in order to support smooth service.

The main functions of the NR PDCP layers 405 and 440 may include some of the following functions.
  Header compression and decompression function (Header compression and decompression: ROHC only)
  User data transmission function
  Sequential delivery function
  Non-sequential delivery function
  Reordering function
  Duplicate detection function
  Retransmission function
  Ciphering or deciphering function
  Timer-based SDU removal function The reordering function of the device of the NR PDCP layer 405 or 440 is a function of sequentially reordering PDCP PDUs received from a lower layer on the basis of a PDCP Sequence Number (SN), and may include a function of sequentially transferring the reordered data to a higher layer The reordering function of the device of the NR PDCP layer 405 or 440 may include a function of directly transmitting data regardless of the sequence, a function of recording PDCP PDUs lost due to the reordering, a function of reporting statuses of the lost PDCP PDUs to a transmitting side, and a function of making a request for retransmitting the lost PDCP PDUs.

The main functions of the NR RLC layers 410 and 435 may include some of the following functions.
  Data transmission function
  Sequential delivery function
  Non-sequential delivery function
  ARQ function
  Concatenation, segmentation, and reassembly function
  Re-segmentation function
  Reordering function
  Duplicate detection function
  Error detection function RLC SDU deletion function RLC re-establishment function The sequential delivery function (In-sequence delivery) of the device of the NR RLC layer 410 or 435 is a function of sequentially transferring RLC SDUs received from a lower layer to a higher layer, and may include a function of, when one original RLC SDU is segmented into a plurality of RLC SDUs and then received, reassembling and transmitting the RLC SDUs The sequential delivery function (In-sequence delivery) of the device of the NR RLC layer 410 or 435 may include a function of reordering the received RLC PDUs on the basis of an RLC Sequence Number (SN) or a PDCP SN, a function of recording RLC PDUs lost due to the reordering, a function of reporting statuses of the lost RLC PDUs to a transmitting side, a function of making a request for retransmitting the lost RLC PDUs, a function of, when there is a lost RLC SDU, sequentially transferring only RLC SDUs preceding the lost RLC SDU to the higher layer, a function of, if a predetermined timer expires even though there is a lost RLC SDU, sequentially transferring all RLC SDUs received before the timer starts to the higher layer, or a function of, when a predetermined timer expires even though there is a lost RLC SDU, sequentially transferring all RLC SDUs received up to now to the higher layer.

Further, the device of the NR RLC layer 410 or 435 may process the RLC PDUs sequentially in a reception order thereof (according to an arrival order regardless of an RLC SN or a PDCP SN) and may transfer the RLC PDUs to the PDCP device regardless of the sequence thereof (out-of-sequence delivery). In the case of segments, the device of the NR RLC layer 410 or 435 may receive segments which are stored in the buffer or will be received in the future, reconfigure the segments to be one complete RLC PDU, process the RLC PDU, and then transmit the same to the PDCP device. The NR RLC layer 410 or 435 may not include a concatenation function, or the function may be performed by the NR MAC layer 415 or 430 or may be replaced with a multiplexing function of the NR MAC layer 415 or 430.

The non-sequential function (Out-of-sequence delivery) of the device of the NR RLC layer 410 or 435 is a function of transferring RLC SDUs received from a lower layer directly to a higher layer regardless of the sequence of the RLC SDUs, and may include, a function of, when one original RLC SDU is segmented into a plurality of RLC SDUs and then received, reassembling and transmitting the RLC PDUs and a function of storing RLC SNs or PDCP SNs of the received RLC PDUs, reordering the RLC PDUs, and recording lost RLC PDUs.

The NR MAC layers 415 and 430 may be connected to a plurality of devices of NR RLC layers 410 and 435 configured in one NR UE, and main functions of the NR MAC layers 410 and 435 may include some of the following functions.

Mapping function

Multiplexing or demultiplexing function

Scheduling information report function

HARQ function

Logical channel priority control function

UE priority control function

MBMS service identification function

Transport format selection function

Padding function

The NR PHY layers 420 and 425 perform an operation of channel-coding or modulating higher layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 5:
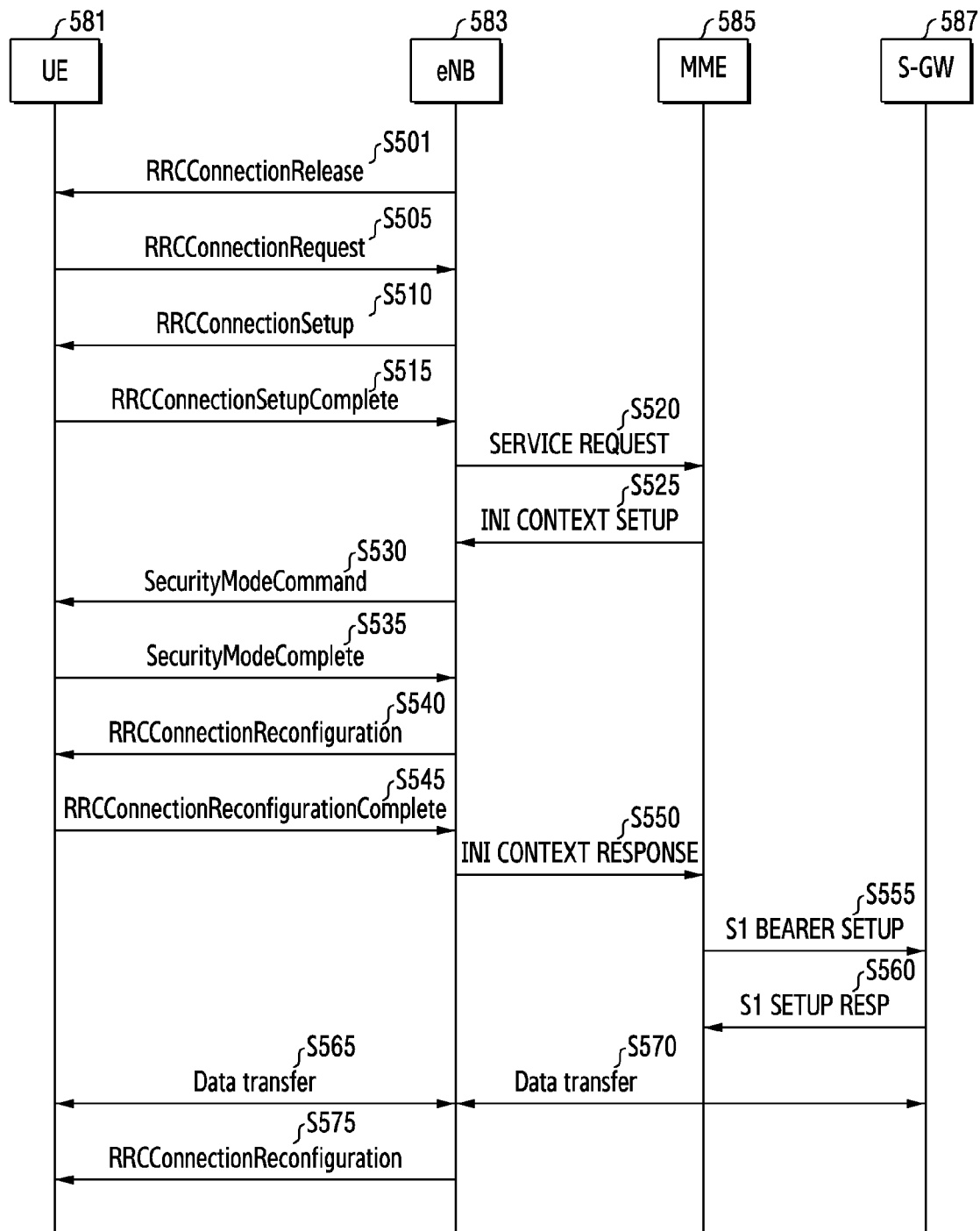
FIG. 5 illustrates a procedure in which the NR UE configures an RRC connection with the NR gNB when the UE configures a connection with a network in the next-generation mobile communication system according to various embodiments of the disclosure.

FIG. 5 illustrates a procedure in which the UE configures an RRC connection with the eNB when the UE configures a connection with a network in the next-generation mobile communication system according to various embodiments of the disclosure.

Referring to FIG. 5, when a UE 581, which transmits and receives data in an RRC-connected mode, has no data transmission/reception during a predetermined time for a predetermined reason, an eNB 583 may transmit an RRC-ConnectionRelease message to the NR UE 581 and allow the NR UE 581 to switch to an RRC-idle mode or an RRC-inactive mode in S501. A UE currently having no configuration for the connection (hereinafter, referred to as an idle mode UE) has data to be transmitted in the future, the UE may perform an RRC connection establishment process or an RRC connection recovery procedure with the eNB 583.

The UE 581 establishes backward transmission synchronization with the eNB through a random access process and transmits an RRCConnectionRequest message to the eNB in S505. The RRCConnectionRequest message may include a reason (establishmentCause) to establish the connection with an identifier of the UE 581.

The eNB 583 transmits an RRCConnectionSetup message to allow the UE 581 to configure the RRC connection in S510. The RRCConnectionSetup message may include at least one piece of configuration information for each logical channel, configuration information for each bearer, configuration information of the PDCP layer device, configuration information of the RLC layer device, or configuration of the MAC layer device.

The RRCConnectionSetup message may include a bearer identifier (for example, an SRB identifier or a Data Radio Bearer (DRB) identifier) for each bearer, information indicating configuration of the PDCP layer device, the RLC layer device, the MAC layer device, and the PHY layer device for each bearer, and information indicating mapping of a logical channel identifier. Further, the RRCConnection-Setup message may include configuration information of a length (for example, 12 bits or 18 bits) of a PDCP SN used by the PDCP layer device for each bearer or configuration information of a length (for example, 6 bits, 12 bits, or 18 bits) of an RLC SN used by the RLC layer device.

The RRCConnectionSetup message may include information indicating whether the PDCP layer device, the SDAP layer device, the RRC layer device, or a new layer device uses the method of segmenting the RRC message or data or the method of reassembling the same proposed by the disclosure for each bearer (SRB or DRB). When the new layer device uses the method of segmenting the RRC message or data or the method of reassembling the same, the RRCConnectionSetup message may include information indicating whether a header of the new layer device is used. For example, the header of the new layer device may be used when the method of segmenting the RRC message or data or the method of reassembling the same proposed by the disclosure is used, and the header of the new layer device may not be used when the method of segmenting the RRC message or data or the method of reassembling the same proposed by the disclosure is not used.

The UE 581 configuring the RRC connection transmits an RRCConnectionSetupComplete message to the eNB 583 in S515. The RRCConnectionSetupComplete message may include a control message of SERVICE REQUEST by which the UE 581 makes a request for configuring a bearer for a predetermined service to the AMF or the MME 585. The eNB 583 may transmit a SERVICE REQUEST message included in the RRCConnectionSetupComplete message to the AMF or the MME 585 in S520. The AMF or the MME 585 may determine whether to provide a service requested by the UE 581.

When it is determined to provide the service requested by the UE 581 on the basis of the determination result, the AMF or the MME 585 transmits an INITIAL CONTEXT SETUP REQUEST message to the eNB 583 in S252. The INITIAL CONTEXT SETUP REQUEST message may include Quality of Service (QoS) information to be applied to Data Radio Bearer (DRB) configuration and security-related information to be applied to the DRB (for example, a security key and a security algorithm).

In order to configure security with the UE 581, the eNB 583 exchanges a SecurityModeCommand message in S530 and a SecurityModeComplete message in S535. When the security configuration is completed, the eNB 583 transmits an RRCConnectionReconfiguration message to the UE 581 in S540.

The RRCConnectionReconfiguration message may include a bearer identifier (for example, an SRB identifier or a Data Radio Bearer (DRB) identifier) for each bearer, information indicating configuration of the PDCP layer device, the RLC layer device, the MAC layer device, and the PHY layer device for each bearer, and information indicating mapping of a logical channel identifier. Further, the RRCConnectionReconfiguration message may include configuration information of a length (for example, 12 bits or 18 bits) of a PDCP SN used by the PDCP layer device for each bearer or configuration information of a length (for example, 6 bits, 12 bits, or 18 bits) of an RLC SN used by the RLC layer device.

The RRCConnectionReconfiguration message may include information indicating whether the PDCP layer device, the SDAP layer device, the RRC layer device, or a new layer device uses the method of segmenting the RRC message or data or the method of reassembling the same proposed by the disclosure for each bearer (SRB or DRB). When the new layer device uses the method of segmenting the RRC message or data or the method of reassembling the same, the RRCConnectionReconfiguration message may include information indicating whether a header of the new layer device is used For example, the header of the new layer device may be used when the method of segmenting the RRC message or data or the method of reassembling the same proposed by the disclosure is used, and the header of the new layer device may not be used when the method of segmenting the RRC message or data or the method of reassembling the same proposed by the disclosure is not used.

The RRCConnectionReconfiguration message may include configuration information of the DRB for processing user data, and the UE 581 configures the DRB by applying the information and transmits an RRCConnectionReconfigurationComplete message to the eNB 583 in S545. The eNB 583 having completed the DRB configuration with the UE 581 may transmit an INITIAL CONTEXT SETUP COMPLETE message to the AMF or the MME 585 and complete the connection in S550. The MME 585 may inform the S-GW 587 that the bearer is configured by transmitting an S1 BEARER SETUP message in S555, and the S-GW 587 may transmit an S1 SETUP RESP message as a response in S560.

When all the processes are completed, the UE 581 may transmit and receive data to and from the eNB 583 through a core network in S565 and S570. According to some embodiments, the data transmission process largely includes three steps of RRC connection configuration, security configuration, and DRB configuration. Further, the eNB may transmit an RRC Connection Reconfiguration message in order to provide new configuration to the UE or add or change the configuration for a predetermined reason in S575.

The RRCConnectionReconfiguration message may include a bearer identifier (for example, an SRB identifier or a Data Radio Bearer (DRB) identifier) for each bearer, information indicating configuration of the PDCP layer device, the RLC layer device, the MAC layer device, and the PHY layer device for each bearer, and information indicating mapping of a logical channel identifier. Further, the RRCConnectionReconfiguration message may include configuration information of a length (for example, 12 bits or 18 bits) of a PDCP SN used by the PDCP layer device for each bearer or configuration information of a length (for example, 6 bits, 12 bits, or 18 bits) of an RLC SN used by the RLC layer device.

The RRCConnectionReconfiguration message may include information indicating whether the PDCP layer device, the SDAP layer device, the RRC layer device, or a new layer device uses the method of segmenting the RRC message or data or the method of reassembling the same proposed by the disclosure for each bearer (SRB or DRB). When the new layer device uses the method of segmenting the RRC message or data or the method of reassembling the same, the RRCConnectionSetup message may include information indicating whether a header of the new layer device is used. For example, the header of the new layer device may be used when the method of segmenting the RRC message or data or the method of reassembling the same proposed by the disclosure is used, and the header of the new layer device may not be used when the method of segmenting the RRC message or data or the method of reassembling the same proposed by the disclosure is not used.

The connection configuration procedure of the UE and the eNB proposed by the disclosure may be applied to connection configuration of the UE and the LTE eNB and connection configuration of the UE and the NR gNB.

In the disclosure, the bearer may be a meaning including an SRB and a DRB. The SRB is mainly used to transmit and receive an RRC message of the RRC layer device, and the DRB is mainly used to transmit and receive user layer data. An Unacknowledged Mode (UM) DRB is a DRB using the RLC layer device operating in an UM, and an Acknowledged Mode (AM) DRB is a DRB using the RLC layer device operating in an AM.

The method of segmenting higher layer data (RRC message or user layer data) or the method of reassembling the same proposed by the disclosure defines a new indicator (for example, a 1-bit or 2-bit indicator or a SN), segments or reassembles data by the RRC layer device, the PDCP layer device, the SDAP layer device, or a newly defined layer device on the basis of the indicator, or segments or reassembles data of the PDCP layer device or a higher layer device. When the new layer device uses the method of segmenting data or the method reassembling the same proposed by the disclosure, the new indicator is defined in or applied to a new header. The method of segmenting data or the method reassembling the same proposed by the disclosure may be configured or not configured for each bearer.

Figure 6:
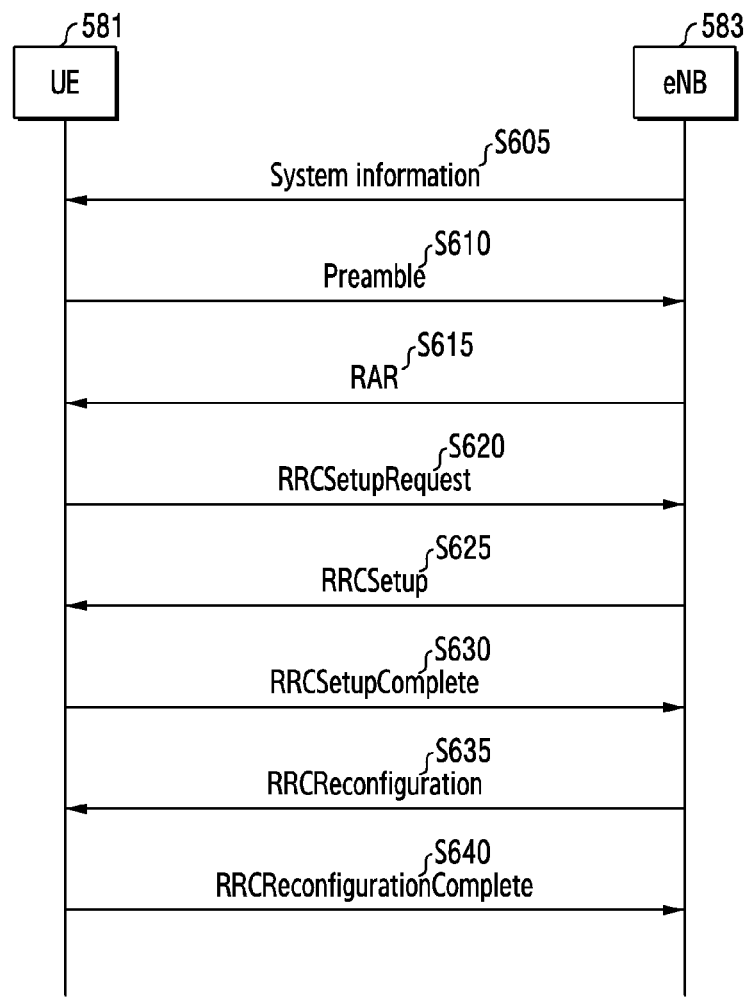
FIG. 6 illustrates an embodiment of configuring a method of dividing higher layer data or a method of reassembling the same according to various embodiments of the disclosure.

FIG. 6 illustrates an embodiment of configuring a method of segmenting higher layer data or a method of reassembling the same according to various embodiments of the disclosure.

In FIG. 6, the UE may perform a cell selection or cell reselection procedure in an RRC-inactive mode or an RRC-idle mode and read system information of a camped-on cell in S605. The system information may include information indicating whether the current cell supports the method of segmenting higher layer data or the method of reassembling the same and information indicating whether the method of segmenting higher layer data or the method of reassembling the same is supported for a specific bearer or for each bearer. For example, the system information may include information indicating whether the method of segmenting higher layer data or the method of reassembling the same is supported for all SRBs except for SRB0. In another example, the system information may include information indicating whether the method of segmenting higher layer data or the method of reassembling the same is supported only for a specific bearer (for example, new SRB4).

The UE 581 may identify whether the method of segmenting higher layer data or the method of reassembling the same is supported through the system information, and the UE 581 or the eNB 583 may apply and use the method of segmenting higher layer data or the method of reassembling the same for a specific bearer on the basis of the system information.

The UE 581 may perform an initial random access procedure in S610 and S615 as illustrated in FIG. 5 and transmit an RRCSetupRequest message to the network through message 3 in S620. The UE 581 may receive an RRCSetup message from the eNB 583 in S625, transmit an RRCSetupComplete message to the eNB 583 in S630, and configure the connection. The eNB 583 may configure a bearer or a layer device in the UE 581 by transmitting an RRCReconfiguration message in S635, and the UE 581 may complete the configuration and transmit an RRCReconfigurationComplete message in S640.

In the above description, when the method of segmenting higher layer data or the method of reassembling the same is supported for a specific bearer, the UE 581 and the eNB 583 may apply the method of segmenting higher layer data or the method of reassembling the same proposed by the disclosure, segment the RRC message into an RRCSetup message, an RRCSteupComplete message, an RRCReconfiguration message, and an RRCReconfigurationComplete message, and transmit the messages and, when the messages are received, may apply the method of segmenting higher layer data or the method of reassembling the same, reassemble the segmented and transmitted RRC messages, and successfully receive a normal RRC message.

Figure 7:
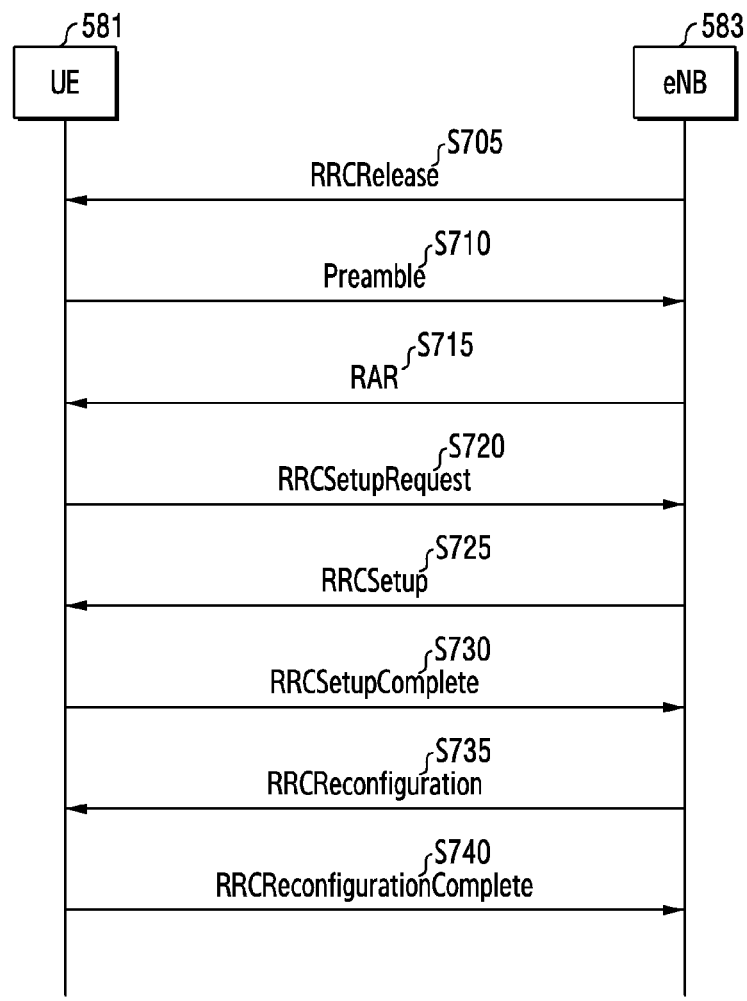
FIG. 7 illustrates another embodiment of configuring the method of dividing higher layer data or the method of reassembling the same according to various embodiments of the disclosure.

FIG. 7 illustrates another embodiment of configuring the method of segmenting higher layer data or the method of reassembling the same according to various embodiments of the disclosure.

In FIG. 7, when the eNB 583 desires to switch the UE 581 to an RRC-inactive mode or an RRC-idle mode, the eNB 583 may transmit an RRCRelease message in S705.

The RRCRelease message may include information indicating whether the method of segmenting higher layer data or the method of reassembling the same is used when the UE 581 configures the connection with the network again in the future or information indicating whether the method of segmenting higher layer data or the method of reassembling the same is used for a specific bearer or for each bearer. For example, the RRCRelease message may include information indicating whether the method of segmenting higher layer data or the method of reassembling the same is used for all SRBs except for SRB0. In another example, the RRCRelease message may include information indicating whether the method of segmenting higher layer data or the method of reassembling the same is used only for a specific bearer (for example, newly defined SRB, that is, SRB4).

The UE 581 may identify whether the method of segmenting higher layer data or the method of reassembling the same is supported through the RRCRelease message, and the UE 581 or the eNB 583 may apply and use the method of segmenting higher layer data or the method of reassembling the same for a specific bearer on the basis of information included in the RRCRelease message.

Since the embodiment of FIG. 7 may be used together with the embodiment of FIG. 6 in which the method of segmenting higher layer data or the method of reassembling the same is configured, the UE 581 may ignore configuration information for the method of segmenting higher layer data or the method of reassembling the same received through the system information if the UE 581 receives configuration information for the method of segmenting higher layer data or the method of reassembling the same through the RRCRelease message. According to an embodiment, the embodiment of FIG. 7 in which the method of segmenting higher layer data or the method of reassembling the same is configured may be prioritized compared to the embodiment of FIG. 6.

When there is no configuration information for the method of segmenting higher layer data or the method of reassembling the same in the RRCRelease message like in the embodiment of FIG. 7, the UE 581 may apply the configuration information for the method of segmenting higher layer data or the method of reassembling the same provided through the system information as illustrated in FIG. 6.

The UE 581 may perform an initial random access procedure in S710 and S715 as illustrated in FIG. 5 and transmit an RRCSetupRequest message to the network through message 3 in order to configure the RRC connection and an RRCResumeRequest message to the network to the network in order to resume the RRC connection in S720. The UE 581 may receive an RRCSetup message or an RRCResume message from the eNB 583 in S725, transmit an RRCSetupComplete message or an RRCResumeComplete message to the eNB 583 in S730, and configure the connection. The eNB 583 may configure a bearer or a layer device in the UE 581 by transmitting an RRCReconfiguration message in S735, and the UE 581 may complete the configuration and transmit an RRCReconfigurationComplete message in S740.

In the above description, when the method of segmenting higher layer data or the method of reassembling the same is supported for a specific bearer, the UE 581 and the eNB 583 may apply the method of segmenting higher layer data or the method of reassembling the same proposed by the disclosure, segment the RRC message into an RRCSetup message, an RRCResume message, an RRCSteupComplete message, an RRCResumeComplete message, an RRCReconfiguration message, and an RRCReconfigurationComplete message, and transmit the messages and, when the messages are received, may apply the method of segmenting higher layer data or the method of reassembling the same, reassemble the segmented and transmitted RRC messages, and successfully receive a normal RRC message.

Figure 8:
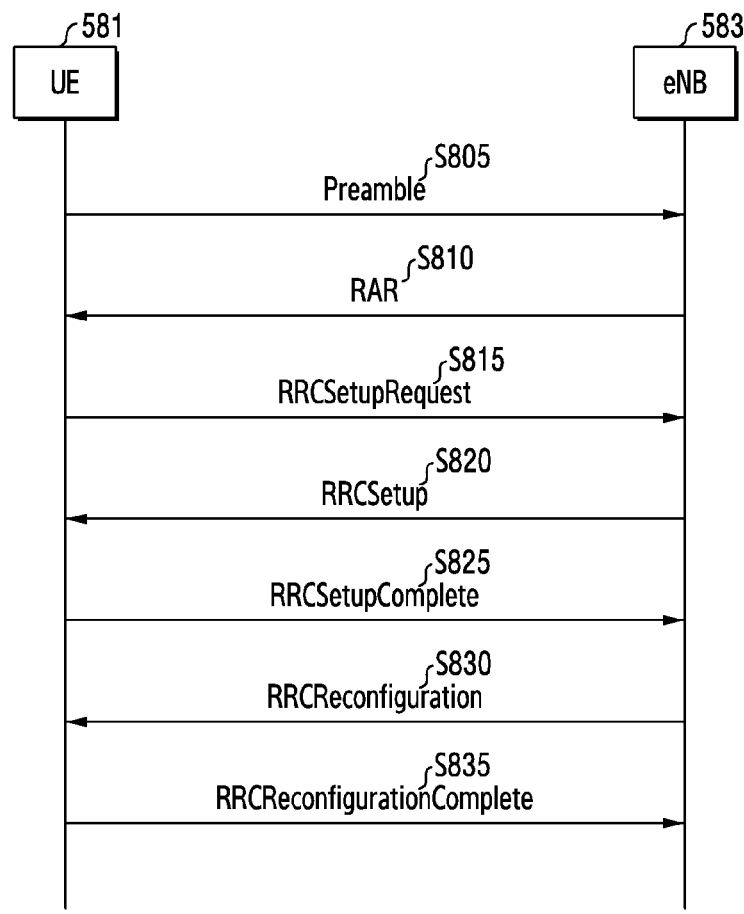
FIG. 8 illustrates an embodiment in which the method of dividing higher layer data or the method of reassembling the same is configured in a procedure in which the UE configures the RRC connection according to various embodiments of the disclosure.

FIG. 8 illustrates an embodiment in which the method of segmenting higher layer data or the method of reassembling the same is configured in a procedure in which the UE configures the RRC connection according to various embodiments of the disclosure.

Referring to FIG. 8, the UE 581 may perform an initial random access procedure in S805 and S810 as illustrated in FIG. 5 and transmit an RRCSetupRequest message to the network through message 3 in S815. At this time, the UE 581 may indicate, through a new indicator, whether the method of segmenting higher layer data or the method of reassembling the same is supported for a specific bearer (for example, SRB1 or newly defined SRB4) in message 3, and the eNB 583 may identify the indicator of message 3 and apply the method of segmenting higher layer data or the method of reassembling the same when transmitting an RRCSetup message through message 4 in S820.

When the UE 581 or the eNB 583 transmits an RRC message, if the size of the RRC message to be transmitted is larger than a predetermined threshold value (for example, 9 kilobytes), the RRC message may be transmitted through a bearer (for example, SRB1, SRB2, or SRB4) to which the method of segmenting higher layer data or the method of reassembling the same proposed by the disclosure is applied. According to an embodiment, through the bearer in which the method of segmenting higher layer data proposed by the disclosure is configured, the division method may be applied to the RRC message of which the size is larger than the predetermined threshold value, and the RRC message may be segmented and transmitted.

Another embodiment of configuring the method of segmenting higher layer data or the method of reassembling the same proposed by the disclosure in FIG. 8 is described below.

The UE 581 may perform an initial random access procedure in S805 and S810 as illustrated in FIG. 5 and transmit an RRCSetupRequest message to the network through message 3 in S815. At this time, the UE 581 may indicate, through a new indicator, whether the method of segmenting higher layer data or the method of reassembling the same is supported for a specific bearer (for example, SRB1 or newly defined SRB4) in message 3, and the eNB 583 may identify the indicator of message 3 and configure whether to apply the method of segmenting higher layer data or the method of reassembling the same proposed by the disclosure to each bearer when transmitting an RRCSetup message through message 4 in S820. After completing the configuration according to message 4, the UE 581 may apply the method of segmenting higher layer data or the method of reassembling the same proposed by the disclosure when transmitting an RRCSetupComplete message in S825. Alternatively, the eNB 583 may apply the method of segmenting higher layer data or the method of reassembling the same proposed by the disclosure when transmitting an RRCReconfiguration message in S830, and the UE S810 may successfully reassemble and receive the segmented RRC messages.

In the above description, when the UE 581 or the eNB 583 transmits an RRC message, if the size of the RRC message to be transmitted is larger than a predetermined threshold value (for example, 9 kilobytes), the RRC message may be transmitted through a bearer (for example, SRB1, SRB2, or SRB4) to which the method of segmenting higher layer data or the method of reassembling the same proposed by the disclosure is applied. That is, through the bearer in which the method of segmenting higher layer data proposed by the disclosure is configured, the division method may be applied to the RRC message of which the size is larger than the predetermined threshold value, and the RRC message may be segmented and transmitted.

Another embodiment of configuring the method of segmenting higher layer data or the method of reassembling the same proposed by the disclosure in FIG. 8 is described below.

The UE 581 may perform an initial random access procedure in S805 and S810 as illustrated in FIG. 5 and transmit an RRCSetupRequest message to the network through message 3 in S815. The eNB may receive message 3 and transmit an RRCSetup message through message 4 in S820, so as to transfer a bearer or layer device configuration to the UE 581. After completing the configuration according to received message 4, the UE 581 may indicate, through a new indicator, whether the method of segmenting higher layer data or the method of reassembling the same proposed by the disclosure is supported for a specific bearer (for example, SRB1 or newly defined SRB4) when transmitting an RRCSetupComplete message in S285. After identifying the indicator of the RRCSetupComplete message, the eNB 583 may apply the method of segmenting higher layer data or the method of reassembling the same proposed by the disclosure. Further, the eNB 583 may apply the method of segmenting higher layer data or the method of reassembling the same proposed by the disclosure when transmitting an RRCReconfiguration message in S830, and the UE 581 may successfully reassemble and receive the segmented RRC messages.

When the UE 581 or the eNB 583 transmits an RRC message, if the size of the RRC message to be transmitted is larger than a predetermined threshold value (for example, 9 kilobytes), the RRC message may be transmitted through a bearer (for example, SRB1, SRB2, or SRB4) to which the method of segmenting higher layer data or the method of reassembling the same proposed by the disclosure is applied. That is, through the bearer in which the method of segmenting higher layer data proposed by the disclosure is configured, the division method may be applied to the RRC message of which the size is larger than the predetermined threshold value, and the RRC message may be segmented and transmitted.

Another embodiment of configuring the method of segmenting higher layer data or the method of reassembling the same proposed by the disclosure in FIG. 8 is described below.

The UE may perform an initial random access procedure in S805 and S810 as illustrated in FIG. 5 and transmit an RRCSetupRequest message to the network through message 3 in S815. The eNB 853 may receive message 3 and transmit an RRCSetup message through message 4, so as to transmit a bearer or layer device configuration in S820. After completing the configuration according to received message 4, the UE 581 may indicate, through a new indicator, whether the method of segmenting higher layer data or the method of reassembling the same proposed by the disclosure is supported for a specific bearer (for example, SRB1 or newly defined SRB4) when transmitting an RRCSetupComplete message in S285. After identifying the indicator of the RRCSetupComplete message, the eNB 583 may configure whether the method of segmenting higher layer data or the method of reassembling the same proposed by the disclosure is supported for a specific bearer (for example, SRB1 or newly defined SRB4) when transmitting an RRCReconfiguration message in S830. The UE 581 may receive an RRC message, apply received configuration information, and transmit an RRCReconfigurationComplete message to the eNB 583. Thereafter, the UE 581 and the eNB 583 may apply the method of segmenting higher layer data and method of reassembling the same proposed by the disclosure, and the UE 581 or the eNB 583 may successfully reassemble and receive the segmented RRC messages.

When the UE 581 or the eNB 583 transmits an RRC message, if the size of the RRC message to be transmitted is larger than a predetermined threshold value (for example, 9 kilobytes), the RRC message may be transmitted through a bearer (for example, SRB1, SRB2, or SRB4) to which the method of segmenting higher layer data or the method of reassembling the same proposed by the disclosure is applied. That is, through the bearer in which the method of segmenting higher layer data proposed by the disclosure is configured, the division method may be applied to the RRC message of which the size is larger than the predetermined threshold value, and the RRC message may be segmented and transmitted.

Another embodiment of configuring the method of segmenting higher layer data or the method of reassembling the same proposed by the disclosure in FIG. 8 is described below.

The UE 581 may perform an initial random access procedure in S805 and S810 as illustrated in FIG. 5 and transmit an RRCSetupRequest message to the network through message 3 in S815. The eNB 583 may receive message 3 and transmit an RRCSetup message through message 4, so as to transmit a bearer or layer device configuration in S820. After completing the configuration according to received message 4, the UE 581 may transmit an RRCSetupComplete message in S825. The eNB 583 may configure whether the method of segmenting higher layer data or the method of reassembling the same is supported for a specific bearer (for example, SRB1 or newly defined SRB4) when transmitting an RRCReconfiguration message in S830. The UE 581 may receive an RRC message, apply received configuration information, and transmit an RRCReconfigurationComplete message to the eNB in S835. Thereafter, the UE 581 and the eNB 583 may apply the method of segmenting higher layer data and method of reassembling the same proposed by the disclosure, and the UE 581 or the eNB 583 may successfully reassemble and receive the segmented RRC messages.

When the UE 581 or the eNB 583 transmits an RRC message, if the size of the RRC message to be transmitted is larger than a predetermined threshold value (for example, 9 kilobytes), the RRC message of which the size is larger than the predetermined threshold value may be transmitted through a bearer (for example, SRB1, SRB2, or SRB4) to which the method of segmenting higher layer data or the method of reassembling the same proposed by the disclosure is applied. That is, through the bearer in which the method of segmenting higher layer data proposed by the disclosure is configured, the division method may be applied to the RRC message of which the size is larger than the predetermined threshold value, and the RRC message may be segmented and transmitted.

In the above embodiments, the eNB 583 may make a request for capability information of the UE 581, receive a UE capability report message, and identify whether the UE 581 supports the method of segmenting higher layer data or the method of reassembling the same proposed by the disclosure.

Figure 9:
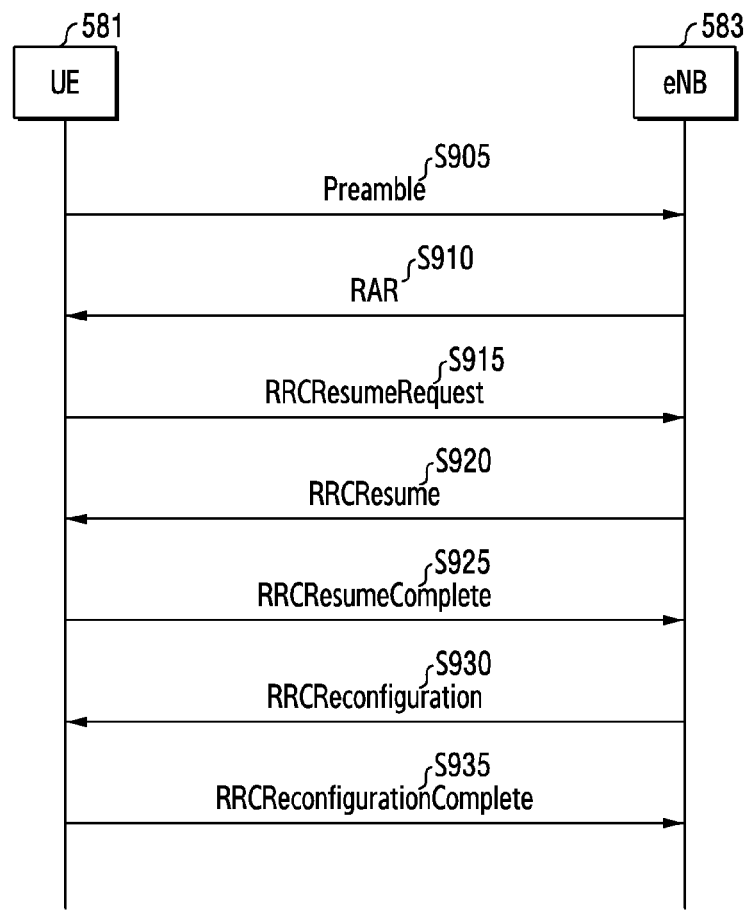
FIG. 9 illustrates an embodiment of configuring the method of dividing higher layer data or the method of reassembling the same in a procedure in which the UE resumes the RRC connection according to various embodiments of the disclosure.

FIG. 9 illustrates an embodiment of configuring the method of segmenting higher layer data or the method of reassembling the same in a procedure in which the UE resumes the RRC connection according to various embodiments of the disclosure.

An embodiment of configuring the method of segmenting higher layer data or the method of reassembling the same proposed by the disclosure in FIG. 9 is described below.

The UE 581 may perform an initial random access procedure in S905 and S910 as illustrated in FIG. 5 and transmit an RRCSetupRequest message to the network through message 3 in S915. At this time, the UE 581 may indicate, through a new indicator, whether the method of segmenting higher layer data or the method of reassembling the same is supported for a specific bearer (for example, SRB1 or newly defined SRB4) in message 3, and the eNB 583 may identify the indicator of message 3 and apply the method of segmenting higher layer data or the method of reassembling the same when transmitting an RRCResume message to the UE 581 through message 4 in S920.

When the UE 581 or the eNB 583 transmits an RRC message, if the size of the RRC message to be transmitted is larger than a predetermined threshold value (for example, 9 kilobytes), the RRC message of which the size is larger than the predetermined threshold value may be transmitted through a bearer (for example, SRB1, SRB2, or SRB4) to which the method of segmenting higher layer data or the method of reassembling the same proposed by the disclosure is applied. That is, through the bearer in which the method of segmenting higher layer data proposed by the disclosure is configured, the division method may be applied to the RRC message of which the size is larger than the predetermined threshold value, and the RRC message may be segmented and transmitted.

Another embodiment of configuring the method of segmenting higher layer data or the method of reassembling the same proposed by the disclosure in FIG. 9 is described below.

The UE 581 may perform an initial random access procedure in S905 and S910 as illustrated in FIG. 5 and transmit an RRCSetupRequest message to the network through message 3 in S915. At this time, the UE 581 may indicate, through a new indicator, whether the method of segmenting higher layer data or the method of reassembling the same is supported for a specific bearer (for example, SRB1 or newly defined SRB4), and the eNB 583 may configure whether the method of segmenting higher layer data or the method of reassembling the same proposed by the disclosure is applied to each bearer when transmitting an RRCResume message through message 4 in S920. After completing the configuration according to message 4, the UE 581 may apply the method of segmenting higher layer data or the method of reassembling the same proposed by the disclosure when transmitting an RRCResumeComplete message in S925. Alternatively, the eNB 583 may apply the method of segmenting higher layer data or the method of reassembling the same proposed by the disclosure when transmitting an RRCReconfiguration message in S930, and the UE 581 may successfully reassemble and receive the segmented RRC messages.

When the UE 581 or the eNB 583 transmits an RRC message, if the size of the RRC message to be transmitted is larger than a predetermined threshold value (for example, 9 kilobytes), the RRC message of which the size is larger than the predetermined threshold value may be transmitted through a bearer (for example, SRB1, SRB2, or SRB4) to which the method of segmenting higher layer data or the method of reassembling the same proposed by the disclosure is applied. That is, through the bearer in which the method of segmenting higher layer data proposed by the disclosure is configured, the division method may be applied to the RRC message of which the size is larger than the predetermined threshold value, and the RRC message may be segmented and transmitted.

Another embodiment of configuring the method of segmenting higher layer data or the method of reassembling the same proposed by the disclosure in FIG. 9 is described below.

The UE 581 may perform an initial random access procedure in S905 and S910 as illustrated in FIG. 5 and transmit an RRCResumeRequest message to the network through message 3 in S915. The eNB 583 may receive message 3 and configure whether to apply the method of segmenting higher layer data or the method of reassembling the same proposed by the disclosure to each bearer when transmitting an RRCResume message through message 4 in S920. After completing the configuration according to message 4, the UE 581 may apply the method of segmenting higher layer data or the method of reassembling the same proposed by the disclosure when transmitting an RRCResumeComplete message in S925. Alternatively, the eNB 583 may apply the method of segmenting higher layer data or the method of reassembling the same proposed by the disclosure when transmitting an RRCReconfiguration message, and the UE 581 may successfully reassemble and receive the segmented RRC messages.

When the UE 581 or the eNB 583 transmits an RRC message, if the size of the RRC message to be transmitted is larger than a predetermined threshold value (for example, 9 kilobytes), the RRC message may be transmitted through a bearer (for example, SRB1, SRB2, or SRB4) to which the method of segmenting higher layer data or the method of reassembling the same proposed by the disclosure is applied. That is, through the bearer in which the method of segmenting higher layer data proposed by the disclosure is configured, the division method may be applied to the RRC message of which the size is larger than the predetermined threshold value, and the RRC message may be segmented and transmitted.

Another embodiment of configuring the method of segmenting higher layer data or the method of reassembling the same proposed by the disclosure in FIG. 9 is described below.

The UE 581 may perform an initial random access procedure in S905 and S910 as illustrated in FIG. 5 and transmit an RRCResumeRequest message to the network through message 3 in S915. The eNB 583 may receive message 3 and receive an RRCResume message through message 4 in S920, so as to transfer a bearer or layer device configuration to the UE 581. After completing the configuration according to received message 4, the UE 581 may indicate, through a new indicator, whether the method of segmenting higher layer data or the method of reassembling the same is supported for a specific bearer (for example, SRB1 or newly defined SRB4) when transmitting an RRCResumeComplete message in S925. After identifying the indicator of the RRCResumeComplete message, the eNB 583 may apply the method of segmenting higher layer data or the method of reassembling the same proposed by the disclosure. Further, the eNB 583 may apply the method of segmenting higher layer data or the method of reassembling the same proposed by the disclosure when transmitting an RRCReconfiguration message in S930, and the UE 581 may successfully reassemble and receive the segmented RRC messages.

When the UE 581 or the eNB 583 transmits an RRC message, if the size of the RRC message to be transmitted is larger than a predetermined threshold value (for example, 9 kilobytes), the RRC message of which the size is larger than the predetermined threshold value may be transmitted through a bearer (for example, SRB1, SRB2, or SRB4) to which the method of segmenting higher layer data or the method of reassembling the same proposed by the disclosure is applied. That is, through the bearer in which the method of segmenting higher layer data proposed by the disclosure is configured, the division method may be applied to the RRC message of which the size is larger than the predetermined threshold value, and the RRC message may be segmented and transmitted.

Another embodiment of configuring the method of segmenting higher layer data or the method of reassembling the same proposed by the disclosure in FIG. 9 is described below.

The UE 581 may perform an initial random access procedure in S905 and S910 as illustrated in FIG. 5 and transmit an RRCResumeRequest message to the network through message 3 in S915. The eNB 583 may receive message 3 and transmit an RRCResume message through message 4 in S920, so as to transmit a bearer or layer device configuration. After completing the configuration according to received message 4, the UE 581 may indicate, through a new indicator, whether the method of segmenting higher layer data or the method of reassembling the same is supported for a specific bearer (for example, SRB1 or newly defined SRB4) when transmitting an RRCResumeComplete message in S925. After identifying the indicator of the RRCSetupComplete message, the eNB 583 may configure whether the method of segmenting higher layer data or the method of reassembling the same is supported for a specific bearer (for example, SRB1 or newly defined SRB4) when transmitting an RRCReconfiguration message in S930. The UE 581 may receive the RRC message, apply received configuration information, and transmit an RRCReconfigurationComplete message to the eNB 583 in S935. Thereafter, the UE 581 and the eNB 583 may apply the method of segmenting higher layer data and method of reassembling the same proposed by the disclosure, and the UE 581 or the eNB 583 may successfully reassemble and receive the segmented RRC messages.

When the UE 581 or the eNB 583 transmits an RRC message, if the size of the RRC message to be transmitted is larger than a predetermined threshold value (for example, 9 kilobytes), the RRC message of which the size is larger than the predetermined threshold value may be transmitted through a bearer (for example, SRB1, SRB2, or SRB4) to which the method of segmenting higher layer data or the method of reassembling the same proposed by the disclosure is applied. That is, through the bearer in which the method of segmenting higher layer data proposed by the disclosure is configured, the division method may be applied to the RRC message of which the size is larger than the predetermined threshold value, and the RRC message may be segmented and transmitted.

Another embodiment of configuring the method of segmenting higher layer data or the method of reassembling the same proposed by the disclosure in FIG. 9 is described below.

The UE 581 may perform an initial random access procedure in S905 and S910 as illustrated in FIG. 5 and transmit an RRCResumeRequest message to the network through message 3 in S915. The eNB 583 may receive message 3 and transmit an RRCResume message through message 4 in S920, so as to transmit a bearer or layer device configuration. After completing the configuration according to received message 4, the UE 581 may transmit an RRCResumeComplete message. After identifying the indicator of the RRCResumeComplete message, the eNB 583 may configure whether the method of segmenting higher layer data or the method of reassembling the same is supported for a specific bearer (for example, SRB1 or newly defined SRB4) when transmitting an RRCReconfiguration message in S930. The UE 581 may receive the RRC message, apply received configuration information, and transmit an RRCReconfigurationComplete message to the eNB. Thereafter, the UE 581 and the eNB 583 may apply the method of segmenting higher layer data and method of reassembling the same proposed by the disclosure, and the UE 581 or the eNB 583 may successfully reassemble and receive the segmented RRC messages.

When the UE 581 or the eNB 583 transmits an RRC message, if the size of the RRC message to be transmitted is larger than a predetermined threshold value (for example, 9 kilobytes), the RRC message of which the size is larger than the predetermined threshold value may be transmitted through a bearer (for example, SRB1, SRB2, or SRB4) to which the method of segmenting higher layer data or the method of reassembling the same proposed by the disclosure is applied. That is, through the bearer in which the method of segmenting higher layer data proposed by the disclosure is configured, the division method may be applied to the RRC message of which the size is larger than the predetermined threshold value, and the RRC message may be segmented and transmitted.

The UE 581 or the eNB 583 may or may not use the method of segmenting higher layer data and method of reassembling the same proposed by the disclosure for each bearer. For example, when the method of segmenting higher layer data and method of reassembling the same proposed by the disclosure is configured in a specific bearer, the method of segmenting higher layer data and method of reassembling the same proposed by the disclosure may be always applied to RRC messages or data transmitted and received through the specific bearer. When the method is applied to a new layer device, a new header including division information may be always used. Further, the method of segmenting higher layer data and method of reassembling the same proposed by the disclosure may not be always applied to a bearer in which the method of segmenting higher layer data and method of reassembling the same proposed by the disclosure is not configured. When the method is applied to a new layer device, a new header including division information may not be always used.

In another method, a routing method based on the size of RRC messages or user layer data may be used. In the disclosure, when the UE 581 or the eNB 583 transmits an RRC message or user layer data, if the size of the RRC message or the user layer data to be transmitted is larger than a predetermined threshold value (for example, 9 kilobytes), the RRC message or the user layer data may be segmented through a bearer (for example, new SRB4, SRB5, or DRB2) to which method of segmenting higher layer data and method of reassembling the same proposed by the disclosure is applied, and the segmented RRC messages or user layer data may be transmitted. That is, through the bearer in which the method of segmenting higher layer data or the method of reassembling the same proposed by the disclosure is configured, the division method may be applied to the RRC message of which the size is larger than the predetermined threshold value, and the RRC message may be segmented and transmitted. When the UE 581 or the eNB 583 transmits an RRC message or user layer data, if the size of the RRC message or the user layer data to be transmitted is not larger than a predetermined threshold value (for example, 9 kilobytes), the RRC message or the user layer data may be transmitted through a bearer (for example, new SRB0, SRB1, or DRB1) to which method of segmenting higher layer data and method of reassembling the same proposed by the disclosure is not applied.

In the above embodiments, the eNB 583 may make a request for capability information of the UE 581, receive a UE capability report message, and identify whether the UE supports the method of segmenting higher layer data or the method of reassembling the same proposed by the disclosure.

Figure 10:
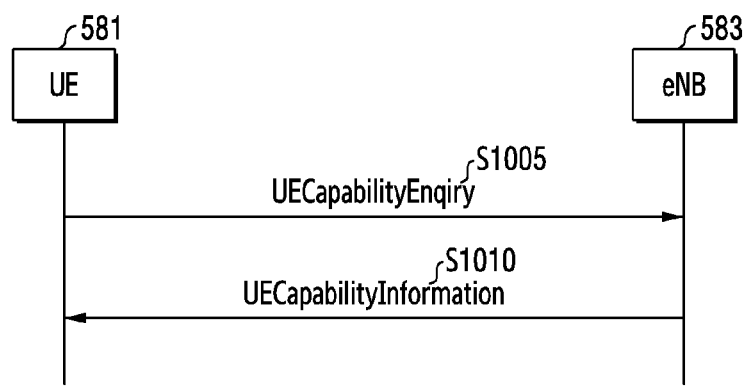
FIG. 10 illustrates a procedure in which the eNB identifies capability of the UE according to various embodiments of the disclosure.

FIG. 10 illustrates a procedure in which the eNB identifies capability of the UE according to various embodiments of the disclosure.

In FIG. 10, the eNB 583 may allow the UE to report a UE capability by transmitting a UECapbilityEnquiry message to the UE in S1005 in order to identify a UE capability. The UECapabilityEnquiry message is received as an RRC message, the UE 581 may configure UE capabilities in a UECapabilityInformation message to report the UE capability, transmit the UECapabilityInformation message to the eNB in S1010, and report the UE capability.

When the UE 581 transmits the UECapabilityInformation message or the eNB 583 transmits the UECapabilityEnquiry message, if the size of the RRC message to be transmitted is larger than a predetermined threshold value (for example, 9 kilobytes), the RRC message may be transmitted through a bearer (for example, SRB1, SRB2, or SRB4) to which the method of segmenting higher layer data or the method of reassembling the same proposed by the disclosure is applied. That is, through the bearer in which the method of segmenting higher layer data or the method of reassembling the same proposed by the disclosure is configured, the division method may be applied to the RRC message of which the size is larger than the predetermined threshold value, and the RRC message may be segmented and transmitted. The method of segmenting higher layer data or the method of reassembling the same may be configured for each bearer (for each of the SRBs or DRBs) according to embodiments of the configuration method proposed by the disclosure in FIGS. 6 to 9.

In another method, as proposed by the disclosure, the eNB may define a new indicator when transmitting an RRC message (for example, the UECapabilityEnquiry message) and indicate whether the UE applies the method of segmenting higher layer data or the method of reassembling the same proposed by the disclosure to an RRC message (for example, the UECapabilityInformation message) which the UE transmits. When the indicator indicates to apply the method of segmenting higher layer data or the method of reassembling the same, the UE segments and transmits the RRC message (for example, the UE Capability Information message) according to the method of segmenting higher layer data or the method of reassembling the same proposed by the disclosure. When the indicator does not indicate the method of segmenting higher layer data or the method of reassembling the same, the UE does not apply the method of segmenting higher layer data or the method of reassembling the same proposed by the disclosure. However, even though the indicator does not indicate the method of segmenting higher layer data or the method of reassembling the same, if the size of the RRC message to be transmitted by the UE is larger than a predetermined threshold value (for example, 9000 kilobytes), the UE may selectively select information on the RRC message (for example, UECapabilityInformation) to be transmitted, configure information, configure the RRC message to be smaller than the threshold value, and transmit the RRC message.

In the embodiments of the configuration method proposed by the disclosure in FIGS. 6 to 9 for the configuration of the method of segmenting higher layer data or the method of reassembling the same, when he method of segmenting higher layer data or the method of reassembling the same is configured in a new layer device, a new header generated by the new layer device is always added to a bearer in which the method of segmenting higher layer data or the method of reassembling the same is configured, but no new layer device is configured in and no new header is added to a bearer in which the method of segmenting higher layer data or the method of reassembling the same is not configured. Further, the method of segmenting higher layer data or the method of reassembling the same is not configured in SRB0. Because the RRC message may be transmitted and received through SRB0 before the RRC connection is configured, and the UE 581 and the eNB 583 cannot identify whether the method of segmenting higher layer data or the method of reassembling the same is used for SRB0.

Alternatively, it is possible to indicate whether there is a new header or data division information by defining one bit at the front of higher layer data regardless of whether the method of segmenting higher layer data or the method of reassembling the same is configured.

Although the UE and the network configure the method of segmenting higher layer data or the method of reassembling the same proposed by the disclosure is configured for a specific bearer through the RRC connection configuration or resume procedure, if signal disconnection or Radio Link Failure (RLF) occurs due to obstacles between the UE and the network, jamming, or fast movement of the UE, the UE 581 and the eNB 583 perform an RRC connection re-establishment procedure to re-establish the connection. At this time, the method of segmenting higher layer data or the method of reassembling the same for the specific bearer may be deactivated, suspended, released, or fell back, or not used. That is, when the UE performs the RRC connection re-establishment procedure, the method of segmenting higher layer data or the method of reassembling the same may not be applied. For example, before the eNB configures back the method of segmenting higher layer data or the method of reassembling the same in the specific bearer, the method of segmenting higher layer data or the method of reassembling the same proposed by the disclosure may not be applied (for example, when a new layer device applies the method of segmenting higher layer data or the method of reassembling the same, a new header may not be used). When the eNB configures back the method of segmenting higher layer data or the method of reassembling the same in the specific bearer through the RRC connection re-establishment procedure or the RRC message, the method of segmenting higher layer data or the method of reassembling the same proposed by the disclosure may be applied again (for example, when a new layer device applies the method of segmenting higher layer data or the method of reassembling the same, a new header may be used again).

In another method, for the bearer in which the method of segmenting higher layer data or the method of reassembling the same has been configured once, the eNB and the UE may continuously apply the method of segmenting higher layer data or the method of reassembling the same proposed by the disclosure to the RRC connection re-establishment procedure without a need to confirm the bearer.

When a new layer device applies the method of segmenting higher layer data or the method of reassembling the same proposed by the disclosure, if the UE switches to an RRC-inactive mode or an RRC-idle mode, a new transmission layer device or a new reception layer device may discard all of segmented data (segments) that are stored in a buffer corresponding to the new layer device and are not reassembled, so that an reassembly error or an unnecessary transmission error that may occur when the connection with the network is reconfigured in the future can be prevented.

The method of segmenting higher layer data or the method of reassembling the same proposed by the disclosure may be suspended when the UE switches to the RRC-inactive mode, and may be resumed by an indication from the network when the RRC connection is re-established. When the UE switches to the RRC-idle mode, the method of segmenting higher layer data or the method of reassembling the same proposed by the disclosure may be released. The data discard procedure of the new layer device may be defined as a re-establishment procedure of the new layer device, and the PDCP layer device may transmit an indicator to the new layer device to trigger the discard procedure when the re-establishment is performed.

Detailed embodiments of the method of segmenting higher layer data or the method of reassembling the same proposed by the disclosure are proposed and described.

Figure 11:
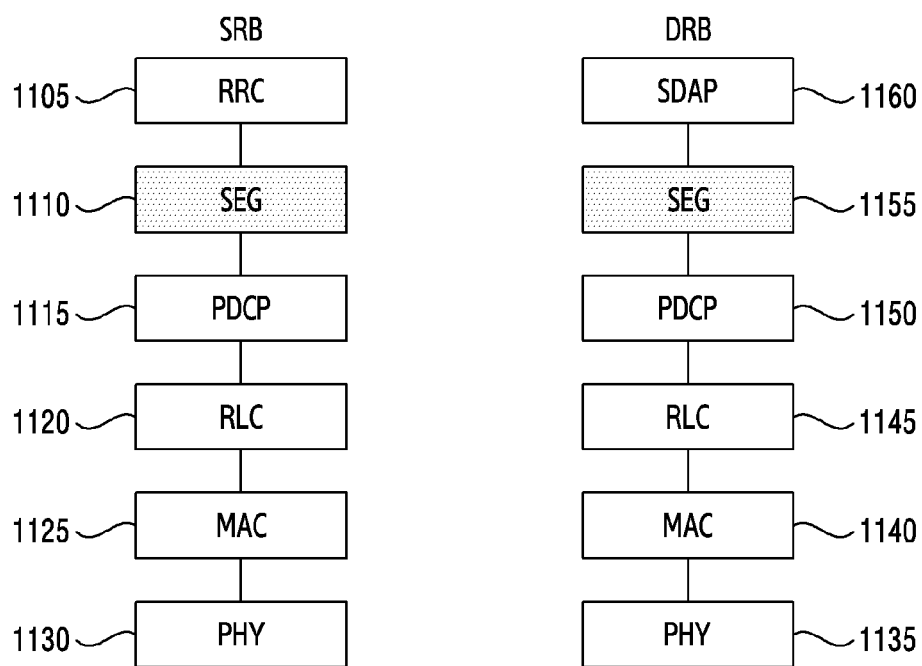
FIG. 11 illustrates an embodiment of the method of dividing higher layer data or the method of reassembling the same according to various embodiments of the disclosure.

FIG. 11 illustrates an embodiment of the method of segmenting higher layer data or the method of reassembling the same according to various embodiments of the disclosure.

The embodiment of the method of segmenting higher layer data or the method of reassembling the same proposed by the disclosure may define new layers (SEG layers 1110 and 1155), and the new layer devices 1110 and 1115 may define fields for division or reassembly in a new header and use the fields for division by a transmitting side and for reassembly by a receiving side.

In the embodiment of the method of segmenting higher layer data or the method of reassembling the same proposed by the disclosure, the new layer device 1110 may be located between a PDCP layer device 1115 and an RRC layer device 1105 for SRBs for transmitting and receiving RRC messages, receive data from the RRC layer device 1105, which is a higher layer device, configure a new header when the received data has a size larger than the maximum size supported by the PDCP layer device 1115 or a specific threshold value, segment the data to include division information, and transmit the data with the new header to the PDCP layer device 1115. When the received data has the size smaller than the maximum size supported by the PDCP layer device 1115 or the a specific threshold value, a new header may be configured, division information including an indication indicating no division may be added to the data, and the data may be transmitted to the PDCP layer device 1115. The new header may exist all the time. However, in order to reduce overhead, the existence or non-existence of the new header may be indicated by defining a 1-bit indicator at the very front. For example, whether there is a new header or whether data is segmented may be indicated by defining one bit of the new header or a header of the PDCP layer device 1115. When the receiving side receives data from the lower PDCP layer device, the new layer device may read the new header, identify division information, perform reassembly if division is performed, remove the header if division is not performed, and transmit the RRC message to a higher layer.

In the embodiment of the method of segmenting higher layer data or the method of reassembling the same proposed by the disclosure, the new layer device may be located between the PDCP layer device 1150 and an SDAP layer device 1160 for DRBs for transmitting and receiving user layer data, receive data from the SDAP layer device 1160, which is a higher layer device, or a higher layer device (in the case in which the SDAP layer device is not configured), configure a new header when the received data a size larger than the maximum size supported by the PDCP layer device 1150 or a specific threshold value, segment the data to include division information, and transmit the data with the new header to the PDCP layer device 1150. When the received data has the size smaller than the maximum size supported by the PDCP layer device 1150 or the a specific threshold value, a new header may be configured, division information including an indication indicating no division may be added to the data, and the data may be transmitted to the PDCP layer device 1150. The new header may exist all the time. However, in order to reduce overhead, the existence or non-existence of the new header may be indicated by defining a 1-bit indicator at the very front. For example, whether there is a new header or whether data is segmented may be indicated by defining one bit of the new header or a header of the PDCP layer device. When the receiving side receives data from the lower PDCP layer device, the new layer device may read the new header, identify division information, perform reassembly if division is performed, remove the header if division is not performed, and transmit the data to a higher layer.

Figure 12:
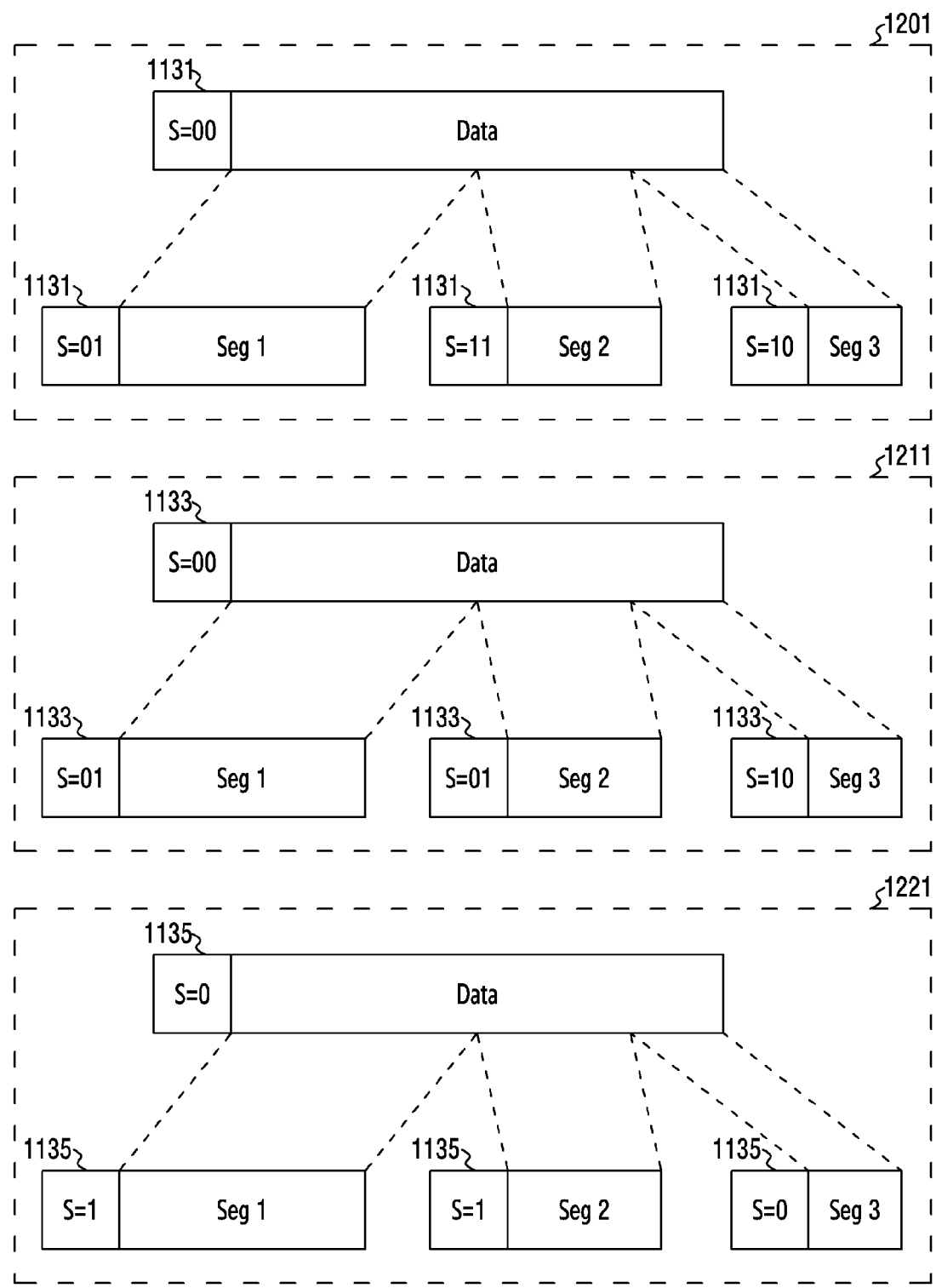
FIG. 12 illustrates a detailed division or reassembly method of the embodiment of FIG. 11 which corresponds to the method of dividing higher layer data or the method of reassembling the same according to various embodiments of the disclosure.

FIG. 12 illustrates a detailed segmentation or reassembly method of the embodiment of FIG. 11 which corresponds to the method of segmenting higher layer data or the method of reassembling the same according to various embodiments of the disclosure.

Reference numeral 1201 of FIG. 12 corresponds to an embodiment of the method of segmenting higher layer data or the method of reassembling the same proposed by the disclosure.

In the embodiment of reference numeral 1201, a transmitting side and a receiving side may define and use a Segmentation (S) field 1131 of 2 bits. The S field 1131 may be defined for four cases of 00, 01, 11, and 10 to indicate complete data that is not segmented, a first segment, an intermediate segment (or a segment other than the first and last segments), and a last segment. The one-to-one mapping between the values such as 00, 01, 11, and 10 of the S field and the segments such as the complete data, the first segment, the intermediate segment (or the segment other than the first and last segments), and the last segment may have 24 cases, and one thereof is defined in the disclosure. According to an embodiment, the S field 1131 may be defined as shown in [Table 4] below.

TABLE 4

| S field value | Meaning |
| --- | --- |
| 00 | Data field includes all pieces of data of SEG SDU |
| 01 | Data field includes first segment of SEG SDU |
| 10 | Data field includes last segment of SEG SDU |
| 11 | Data field includes segment other than first and last segments of SEG SDU |

As illustrated in FIG. 11, since the newly defined layer device (SEG layer device 1110 or 1155) is defined and used above the PDCP layer device 1115 or 1150, when the reception RLC layer device operates in the AM, transmission of data without data loss is supported, and the reception PDCP layer device sequentially arranges the data according to the PDCP SN and transfers the data to the reception SDG layer device. Accordingly, the new layer device may not need the SN. Through the S field 1131 of 2 bits, the transmitting side may segment the RRC message or data and the receiving side may successfully reassemble and receive segmented data.

The operation of the transmitting side according to the embodiment of reference numeral 1201 for the method of segmenting higher layer dater or the method of reassembling the same is described below.

The new layer device segments data if the size of the RRC message or the data received from the higher layer device is larger than the maximum size supported by the PDCP layer device or a specific threshold value, and does not segment data if the size is not larger.

When the data is segmented, in the case of the first segmented data (segment), the S field 1131 of the new header is configured as 01, the header is added to the front of the first segmented data (segment), and the data is transmitted to a lower layer device. In the case of the intermediate segmented data (segment), the S field 1131 of the new header is configure as 11, the header is added to the front of the intermediate segmented data (segment), and the data is transmitted to a lower layer device. In the case of the last segmented data (segment), the S field 1131 of the new header is configure as 10, the header is added to the front of the last segmented data (segment), and the data is transmitted to a lower layer device.

When data segmentation is not performed, the S field 1131 of the new header for data received form a higher layer is configured as 00, the header is added to the front of the data, and the data is transmitted to a lower layer device.

The operation of the receiving side according to the embodiment of reference numeral 1201 for the method of segmenting higher layer dater or the method of reassembling the same proposed by the disclosure is described below.

When a new layer device is configured for a specific bearer (SRB or DRB) or when the method of segmenting data or reassembling the same proposed by the disclosure is configured, the new layer device of the receiving side reads a new header and identifies whether received data is segmented RRC messages or data or a non-segmented RRC message or data.

When the data is the non-segmented RRC message or data on the basis of the identification of the new header of the currently received data, the new header may be removed and the RRC message or data may be transmitted to a higher layer. When the data is the segmented RRC message or data (segments), the S field 1131 of the new header may be identified and stored in a buffer. Then, when a first segment, an intermediate segment, and a last segment are all received, the received segments may be reassembled, new headers of the segments may be removed to configure a complete RRC message or data, and the complete RRC message or data may be transmitted to a higher layer device. The reassembly procedure may be performed when the S field 1131 of the new header indicates the last segment. When the received segments are reassembled to be complete data and transmitted to the higher layer device, the complete data may be discarded from the buffer.

Reference numeral 1211 of FIG. 12 corresponds to another embodiment of the method of segmenting higher layer data or the method of reassembling the same proposed by the disclosure.

In the embodiment of reference numeral 1211, a transmitting side and a receiving side may define and use S field 1133 of 2 bits. The S field 1133 may be defined for three cases among the four cases of 00, 01, 11, 10 to indicate complete data that is not segmented, a segment other than the last segment (or indicate there is another segment), and the last segment. The one-to-one mapping between three values among 00, 01, 11, and 10 of the S field and the segments such as the complete data, the segment other than the last segment (or indication indicating that there is another segment), and the last segment may have 24 cases, and one thereof is defined in the disclosure. One remaining value of 00, 01, 11, and 10 may be reserved for another function in the future. According an embodiment, the S field 1133 may be defined as shown in [Table 5] below.

TABLE 5

| S field value | Meaning |
| --- | --- |
| 00 | Data field includes all pieces of data SEG SDU |
| 01 | Data field includes segment other than last segment of SEG SDU |
| 10 | Data field includes last segment of SEG SDU |
| 11 | Not used. Reserved. |

As illustrated in FIG. 11, since the newly defined layer device (SEG layer device 1110 or 1155) is defined and used above the PDCP layer device 1115 or 1150, when the reception RLC layer device operates in the AM, transmission of data without data loss is supported, and the reception PDCP layer device sequentially arranges the data according to the PDCP SN and transfers the data to the reception SDG layer device. Accordingly, the new layer device may not need the SN. Through the S field 1131 of 2 bits, the transmitting side may segment the RRC message or data and the receiving side may successfully reassemble and receive segmented data.

The operation of the transmitting side according to the embodiment of reference numeral 1211 for the method of segmenting higher layer dater or the method of reassembling the same is described below.

The new layer device segments data if the size of the RRC message or the data received from the higher layer device is larger than the maximum size supported by the PDCP layer device or a specific threshold value, and does not segment data if the size is not larger.

When data segmentation is performed, in the case of a segment other than the last segmented data (segment), the S field 1133 of the new header is configured as 01, the header is added to the front of the segmented data, and the data is transmitted to a lower layer device. In the case of the last segmented data (segment), the S field 1133 of the new header is configured as 10, the header is added to the front of the last segmented data, and the data is transmitted to a higher layer device.

When data segmentation is not performed, the S field 1133 of the new header for data received form a higher layer is configured as 00, the header is added to the front of the data, and the data is transmitted to a lower layer device.

The operation of the receiving side according to the embodiment of reference numeral 1211 for the method of segmenting higher layer dater or the method of reassembling the same is described below.

When a new layer device is configured for a specific bearer (SRB or DRB) or when the method of segmenting data or reassembling the same proposed by the disclosure is configured, the new layer device of the receiving side reads a new header and identifies whether received data is segmented RRC messages or data or a non-segmented RRC message or data.

When the data is the non-segmented RRC message or data on the basis of the identification of the new header of the currently received data, the new header may be removed and the RRC message or data may be transmitted to a higher layer device. When the data is the segmented RRC message or data, the S field 1133 of the new header may be identified and stored in a buffer. Then, when segments, which are not a last segment, and last segment are all received, the received segments may be reassembled, new headers of the segments may be removed to configure a complete RRC message or data, and the complete RRC message or data may be transmitted to a higher layer device. The reassembly procedure may be performed when the S field 1133 of the new header indicates the last segment. When the received segments are reassembled to be complete data and transmitted to the higher layer device, the complete data may be discarded from the buffer.

Reference numeral 1221 of FIG. 12 corresponds to another embodiment of the method of segmenting higher layer data or the method of reassembling the same proposed by the disclosure.

In the embodiment of reference numeral 1221, a transmitting side and a receiving may define and use S field 1135 of 1 bit. The S field 1135 may be defined for two cases of 0 and 1 to indicate complete data (or the last segment) that is not segmented) and a segment other than the last segment (or indicate that there is another segment). At this time, the one-to-one mapping between two values of 0 and 1 of the S field 1135 and the segments such as the complete data (or the last segment) and the segment other than the last segment (or indication indicating that there is another segment) may have 2 cases, and one thereof is defined in the disclosure. For example, the S field 1135 may be defined as shown in [Table 6] below.

TABLE 6

| S field value | Meaning |
|---|---|
| 0 | Indicates all pieces of data of SEG SDU, last segment of SED SDU, or no segment of SEG SDU |
| 1 | Indicates segment other than last segment of SEG SDU or another segment of SEG SDU |

As illustrated in FIG. 11, since the newly defined layer device (SEG layer device 1110 or 1155) is defined and used above the PDCP layer device 1115 or 1150, when the reception RLC layer device operates in the AM, transmission of data without data loss is supported, and the reception PDCP layer device sequentially arranges the data according to the PDCP SN and transfers the data to the reception SDG layer device. Accordingly, the new layer device may not need the SN. Through the S fields 1135 of 1 bit, the transmitting side may divide the RRC message or data and the receiving side may successfully reassemble and receive divided data.

The operation of the transmitting side according to the embodiment of reference numeral 1221 for the method of segmenting higher layer dater or the method of reassembling the same is described below.

The new layer device divides data if the size of the RRC message or the data received from the higher layer device is larger than the maximum size supported by the PDCP layer device or a specific threshold value, and does not divide data if the size is not larger.

When the data segmentation is performed, in the case of a segment other than the last segmented data (segment), the S field 1135 of the new header is configured as 01, the header is added to the front of the segmented data, and the data is transmitted to a lower layer device. In the case of the last segmented data (segment) (or in the case of complete data that is not segmented), the S field 1135 of the new header is configured as 0, the header is added to the front of the last segmented data (or complete data that is not segmented), and the data is transmitted to a lower layer device.

When data segmentation is not performed, the S field 1135 of the new header for data received form a higher layer is configured as 0, the header is added to the front of the data, and the data is transmitted to a lower layer device.

The operation of the receiving side according to the embodiment of reference numeral 1221 for the method of segmenting higher layer dater or the method of reassembling the same is described below.

When a new layer device is configured for a specific bearer (SRB or DRB) or when the method of segmenting data or reassembling the same proposed by the disclosure is configured, the new layer device of the receiving side reads a new header and identifies whether information indicated by the header indicates the last segmented data (segment), the complete data that is not segmented, that there is no other segment, or that there is segmented data (segment) or another segment.

When the S field 1135 of the new header of the currently received data indicates 0 (that is, indicates the last segmented data (segment), the complete data that is not segmented, or that there is no other segment) and when there is data of which the S field of the header is 1 among data received after the last data of which the S field 1135 of the header is 0 in the received existing data, the data of which the S field 1135 of the header is 1 may be reassembled with the currently received data according to a reception order to configure complete data, new header may be removed, and the complete data may be transmitted to a higher layer device.

When the S field 1135 of the new header of the currently received data indicates 0 and when there is no data of which the S field of the header is 1 among data received after the last data of which the S field 1135 of the header is 0 in the received existing data, that is, when the S field 1135 of the header of previously received data is 0, it means that the currently received data is complete data that is not segmented, and thus a new header may be removed and the complete data may be transmitted to a higher layer device.

When the S field 1135 of the new header of the currently received data indicates 1 (indicates the segmented data (segment) or that there is another segment), the new header of the data is identified, removed, and stored in a buffer until reassembly is performed or data of which the S field 1135 of the header is 0 arrives. When the received segments are reassembled to be complete data and transmitted to the higher layer device, the complete data may be discarded from the buffer.

Figure 13A:
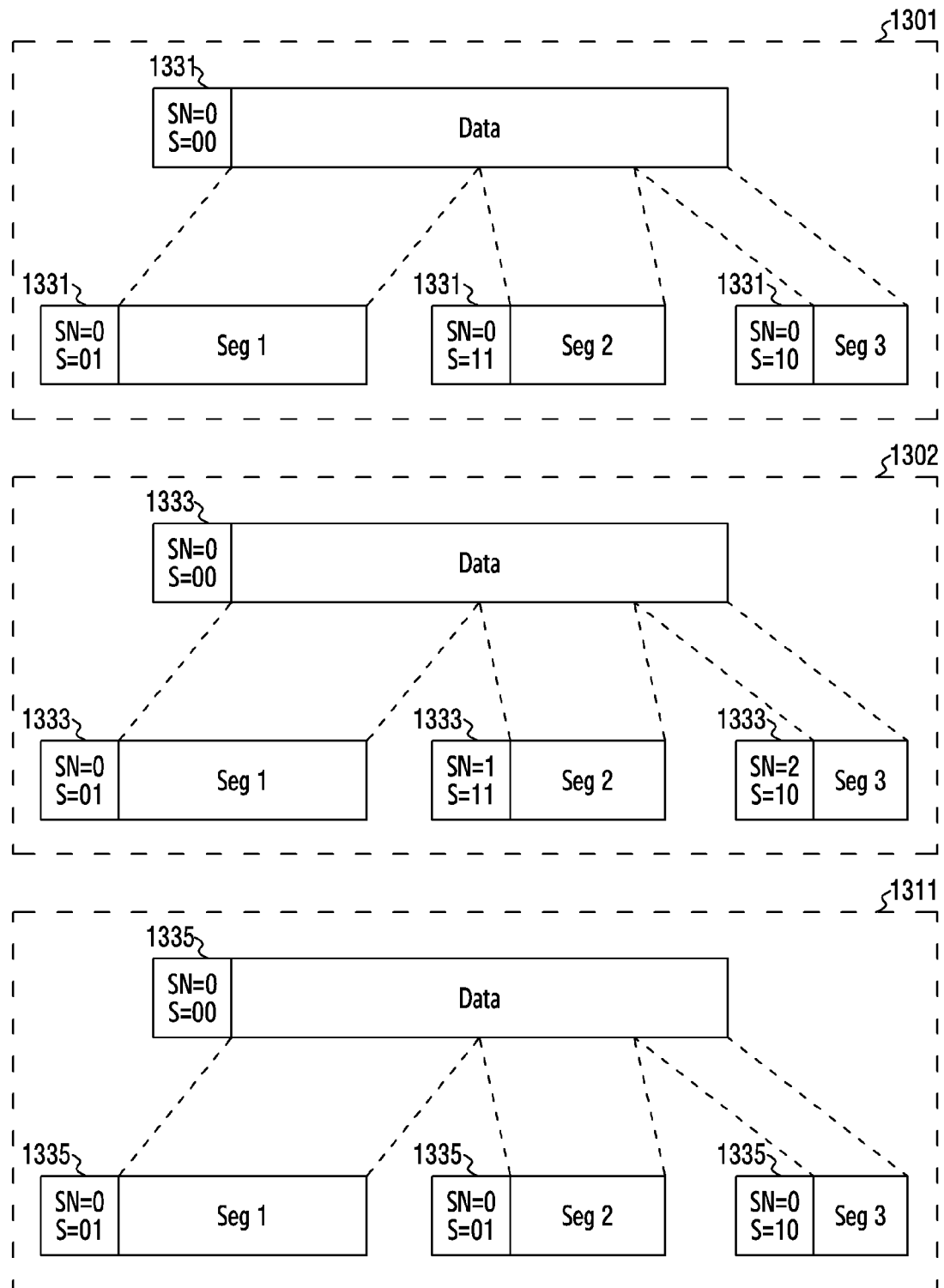
FIG. 13A illustrates a detailed segmentation or reassembly method of another embodiment which corresponds to the method of segmenting higher layer data or the method of reassembling the same according to various embodiments of the disclosure.
Figure 13B:
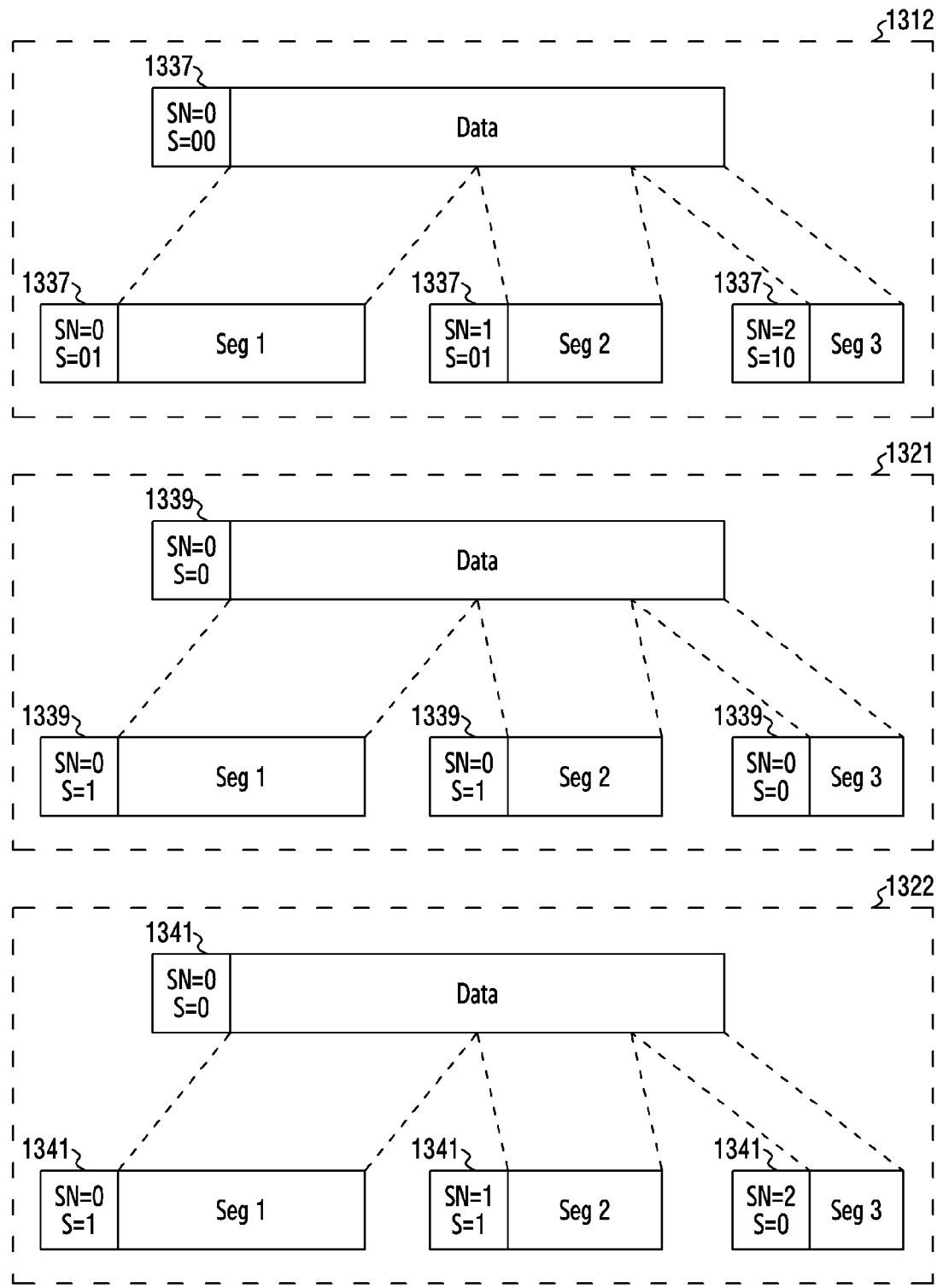
FIG. 13B illustrates a detailed segmentation or reassembly method of another embodiment which corresponds to the method of segmenting higher layer data or the method of reassembling the same according to various embodiments of the disclosure.

FIG. 13A illustrates a detailed segmentation or reassembly method of another embodiment which corresponds to the method of segmenting higher layer data or the method of reassembling the same according to various embodiments of the disclosure, and FIG. 13B illustrates a detailed segmentation or reassembly method of another embodiment which corresponds to the method of segmenting higher layer data or the method of reassembling the same according to various embodiments of the disclosure.

Reference numeral 1301 of FIG. 13A corresponds to another embodiment of the method of segmenting higher layer data or the method of reassembling the same proposed by the disclosure.

In the embodiment of reference numeral 1301, a transmitting side and a receiving side may define and use an S field 1331 of 2 bits. The S field 1331 may be defined for four cases of 00, 01, 11, and 10 to indicate complete data that is not segmented, a first segment, an intermediate segment (or a segment other than the first and last segments), and a last segment. The one-to-one mapping between the values 00, 01, 11, and 10 of the S field and the segments such as the complete data, the first segment, the intermediate segment (or the segment other than the first and last segments), and the last segment may have 24 cases, and one thereof is defined in the disclosure. For example, the S field may be defined as shown in [Table 7].

TABLE 7

| S field value | Meaning |
| --- | --- |
| 00 | Data field includes all pieces of data SEG SDU |
| 01 | Data field includes first segment of SEG SDU |
| 10 | Data field includes last segment of SEG SDU |
| 11 | Data field includes segment other than first and last segments of SEG SDU |

As illustrated in FIG. 11, since the newly defined layer device (SEG layer device 1110 or 1155) is defined and used above the PDCP layer device 1115 or 1150, when the reception RLC layer device operates in the AM, transmission of data without data loss is supported, and the reception PDCP layer device sequentially arranges the data according to the PDCP SN and transfers the data to the reception SDG layer device. However, when the reception RLC layer device operates in the UM and allows data loss or when data transmission between the RLC layer device and the PDCP layer device is configured wiredly or wirelessly due to implementation of the CU-DU split structure of the eNB and thus data loss is generated, the new layer device may need the SN, and only when the SN is used together with the S field of 2 bits, the transmitting side may segment the RRC message or data and the receiving side may successfully reassemble and receive the segmented data even though there is data loss.

The operation of the transmitting side according to the embodiment of reference numeral 1301 for the method of segmenting higher layer dater or the method of reassembling the same is described below.

The new layer device divides data if the size of the RRC message or the data received from the higher layer device is larger than the maximum size supported by the PDCP layer device or a specific threshold value, and does not divide data if the size is not larger.

In the embodiment of reference numeral 1301, when the SN is allocated, the same SN is allocated to pieces of data (segments) segmented from the same higher layer data (SEG SDU). Accordingly, segments having the same SN may indicate that they are segmented from the same data. However, when the one same data is segmented into four or more segments and second and third segments are lost, the receiving side cannot identify the lost second or third segment or cannot detect whether segments are lost, and thus a reassembly error may occur. That is, reassembly may not be successful. Accordingly, when the number of segments is smaller than or equal to 3, the normal operation may be performed without any error.

When data segmentation is performed, the same SN is allocated to segments. In the case of a first segmented data (segment), the S field 1331 of the new header is configured as 01, the header is added to the front of the first divided data (segment), and the data is transmitted to a lower layer device. In the case of an intermediate divided data (segment), the S field 1331 of the new header is configured as 11, the header is added to the front of the intermediate divided data (segment), and the data is transmitted to a lower layer device. In the case of a last segmented data (segment), the S field 1331 of the new header is configured as 10, the header is added to the front of the last segmented data, and the data is transmitted to a higher layer device.

When data segmentation is not performed, the S field 1331 of the new header for data received form a higher layer is configured as 00, the SN is allocated, the header is added to the front of the data, and the data is transmitted to a lower layer device.

The operation of the receiving side according to the embodiment of reference numeral 1301 for the method of segmenting higher layer dater or the method of reassembling the same is described below.

When a new layer device is configured for a specific bearer (SRB or DRB) or when the method of segmenting data or reassembling the same proposed by the disclosure is configured, the new layer device of the receiving side reads a new header and identifies whether received data is segmented RRC messages or data or a non-segmented RRC message or data. It may be identified that segments having the same SN are segmented from one data.

When the data is the non-segmented RRC message or data on the basis of the identification of the new header of the currently received data, the new header may be removed and the RRC message or data may be transmitted to a higher layer device. When the data is the segmented RRC message or data (segments), the SN and the S field 1331 of the new header may be identified and stored in a buffer. Then, when a first segment, an intermediate segment, and a last segment are all received, the received segments may be reassembled, new headers of the segments may be removed to configure a complete RRC message or data, and the complete RRC message or data may be transmitted to a higher layer device. The reassembly procedure may be performed when all segments are received for a specific SN. When the received segments are reassembled to be complete data and transmitted to the higher layer device, the complete data may be discarded from the buffer.

Reference numeral 1302 of FIG. 13A corresponds to another embodiment of the method of segmenting higher layer data or the method of reassembling the same proposed by the disclosure.

In the embodiment of reference numeral 1302, a transmitting side and a receiving side may define and use an S field 1333 of 2 bits. The S field 1333 may be defined for four cases of 00, 01, 11, and 10 to indicate complete data that is not segmented, a first segment, an intermediate segment (or a segment other than the first and last segments), and a last segment. The one-to-one mapping between the values 00, 01, 11, and 10 of the S field and the segments such as the complete data, the first segment, the intermediate segment (or the segment other than the first and last segments), and the last segment may have 24 cases, and one thereof is defined in the disclosure. For example, the S field 1333 may be defined as shown in [Table 8] below.

TABLE 8

| S field value | Meaning |
| --- | --- |
| 00 | Data field includes all pieces of data SEG SDU |
| 01 | Data field includes first segment of SEG SDU |
| 10 | Data field includes last segment of SEG SDU |
| 11 | Data field includes segment other than first and last segments of SEG SDU |

As illustrated in FIG. 11, since the newly defined layer device (SEG layer device 1110 or 1155) is defined and used above the PDCP layer device 1115 or 1150, when the reception RLC layer device operates in the AM, transmission of data without data loss is supported, and the reception PDCP layer device sequentially arranges the data according to the PDCP SN and transfers the data to the reception SDG layer device. However, when the reception RLC layer device operates in the UM and allows data loss or when data transmission between the RLC layer device and the PDCP layer device is configured wiredly or wirelessly due to implementation of the CU-DU split structure of the eNB and thus data loss is generated, the new layer device may need the SN, and only when the SN is used together with the S field of 2 bits, the transmitting side may segment the RRC message or data and the receiving side may successfully reassemble and receive the segmented data even though there is data loss.

The operation of the transmitting side according to the embodiment of reference numeral 1302 for the method of segmenting higher layer dater or the method of reassembling the same is described below.

The new layer device divides data if the size of the RRC message or the data received from the higher layer device is larger than the maximum size supported by the PDCP layer device or a specific threshold value, and does not divide data if the size is not larger.

In the embodiment of reference numeral 1302, when the SN is allocated, different SN are allocated to pieces of data (segments) segmented from the same higher layer data (SEG SDU). Accordingly, the SNs may indicate sequences of the respective segments, and the S field 1333 may indicate parts of the one data from which the segments are segmented. Therefore, even though four or more segments are segmented from the one same data and a second or third segment is lost, the receiving side may identify the lost second or third segment on the basis of the SN and detect whether the segment is lost.

When data segmentation is performed, the different SNs are allocated to segments. In the case of a first segmented data (segment), the S field 1333 of the new header is configured as 01, the header is added to the front of the first divided data (segment), and the data is transmitted to a lower layer device. In the case of an intermediate divided data (segment), the S field 1333 of the new header is configured as 11, the header is added to the front of the intermediate divided data (segment), and the data is transmitted to a lower layer device. In the case of a last segmented data (segment), the S field 1333 of the new header is configured as 10, the header is added to the front of the last segmented data, and the data is transmitted to a higher layer device.

When data segmentation is not performed, the S field 1333 of the new header for data received form a higher layer is configured as 00, the SN is allocated, the header is added to the front of the data, and the data is transmitted to a lower layer device.

The operation of the receiving side according to the embodiment of reference numeral 1302 for the method of segmenting higher layer dater or the method of reassembling the same is described below.

When a new layer device is configured for a specific bearer (SRB or DRB) or when the method of segmenting data or reassembling the same proposed by the disclosure is configured, the new layer device of the receiving side reads a new header and identifies whether received data is segmented RRC messages or data or a non-segmented RRC message or data. It may be identified that SNs indicate sequences of different segments. Accordingly, if there is a gap between the SNs, it may be noted that there is data loss.

When the data is the non-segmented RRC message or data on the basis of the identification of the new header of the currently received data, the new header may be removed and the RRC message or data may be transmitted to a higher layer device. When the data is the segmented RRC message or data (segments), the SN and the S field 1333 of the new header may be identified and stored in a buffer. Then, when a first segment, an intermediate segment, and a last segment are all received, the received segments may be reassembled, new headers of the segments may be removed to configure a complete RRC message or data, and the complete RRC message or data may be transmitted to a higher layer device. The reassembly procedure may be performed when all segments or one data (SEG SDU) are received on the basis of the SNs and the S field 1333. When the received segments are reassembled to be complete data and transmitted to the higher layer device, the complete data may be discarded from the buffer.

Reference numeral 1311 of FIG. 13A corresponds to another embodiment of the method of segmenting higher layer data or the method of reassembling the same proposed by the disclosure.

In the embodiment of reference numeral 1311, a transmitting side and a receiving side may define and use an S field 1335 of 2 bits. The S fields 1335 may be defined by three cases among the four cases of 00, 01, 11, 10 to indicate complete data that is not segmented, a segment other than the last segment (or indicate there is another segment), and the last segment. The one-to-one mapping between three values among 00, 01, 11, and 10 of the S fields and the segments such as the complete data, the segment other than the last segment (or indication indicating that there is another segment), and the last segment may have 24 cases, and one thereof is defined in the disclosure. One remaining value of 00, 01, 11, and 10 may be reserved for another function in the future. For example, the S field 1335 may be defined as shown in [Table 9] below.

TABLE 9

| S field value | Meaning |
| --- | --- |
| 00 | Data field includes all pieces of data SEG SDU |
| 01 | Data field includes last segment of SEG SDU |
| 10 | Data field includes last segment of SEG SDU |
| 11 | Not used. Reserved. |

As illustrated in FIG. 11, since the newly defined layer device (SEG layer device 1110 or 1155) is defined and used above the PDCP layer device 1115 or 1150, when the reception RLC layer device operates in the AM, transmission of data without data loss is supported, and the reception PDCP layer device sequentially arranges the data according to the PDCP SN and transfers the data to the reception SDG layer device. However, when the reception RLC layer device operates in the UM and allows data loss or when data transmission between the RLC layer device and the PDCP layer device is configured wiredly or wirelessly due to implementation of the CU-DU split structure of the eNB and thus data loss is generated, the new layer device may need the SN, and only when the SN is used together with the S field 1335 of 2 bits, the transmitting side may segment the RRC message or data and the receiving side may successfully reassemble and receive the segmented data even though there is data loss.

The operation of the transmitting side according to the embodiment of reference numeral 1311 for the method of segmenting higher layer dater or the method of reassembling the same is described below.

- The new layer device divides data if the size of the RRC message or the data received from the higher layer device is larger than the maximum size supported by the PDCP layer device or a specific threshold value, and does not divide data if the size is not larger.
- In the embodiment of reference numeral 1311, when the SN is allocated, the same SN is allocated to pieces of data (segments) segmented from the same higher layer data (SEG SDU). Accordingly, segments having the same SN may indicate that they are segmented from the same data. However, when the one same data is segmented into four or more segments and the second or third segment is lost, the receiving side cannot identify the lost second or third segment or cannot detect whether the segment is lost, and thus a reassembly error may occur. That is, reassembly may not be successful. Accordingly, when the number of segments is smaller than or equal to 3, the normal operation may be performed without any error.
- When data segmentation is performed, the same SN is allocated to segments. In the case of a segment other than the last segmented data (segment), the S field 1335 of the new header is configured as 01, the header is added to the front of the segmented data, and the data is transmitted to a lower layer device. In the case of the last segmented data (segment), the S field 1335 of the new header is configured as 10, the header is added to the front of the last segmented data, and the data is transmitted to a higher layer device.
- When data segmentation is not performed, the SN is allocated, the S field 1335 of the new header for data received form a higher layer is configured as 00, the header is added to the front of the data, and the data is transmitted to a lower layer device.

The operation of the receiving side according to the embodiment of reference numeral 1311 for the method of segmenting higher layer dater or the method of reassembling the same is described below.

- When a new layer device is configured for a specific bearer (SRB or DRB) or when the method of segmenting data or reassembling the same proposed by the disclosure is configured, the new layer device of the receiving side reads a new header and identifies whether received data is segmented RRC messages or data or a non-segmented RRC message or data. It may be identified that segments having the same SN are segmented from one data.
- When the data is the non-segmented RRC message or data on the basis of the identification of the new header of the currently received data, the new header may be removed and the RRC message or data may be transmitted to a higher layer device. When the data is the segmented RRC message or data, the SN and the S field 1335 of the new header may be identified and stored in a buffer. Then, when segments, which are not a last segment, and last segment are all received, the received segments may be reassembled, new headers of the segments may be removed to configure a complete RRC message or data, and the complete RRC message or data may be transmitted to a higher layer device. The reassembly procedure may be performed when all segments are received for a specific SN. When the received segments are reassembled to be complete data and transmitted to the higher layer device, the complete data may be discarded from the buffer.

Reference numeral 1312 of FIG. 13B corresponds to another embodiment of the method of segmenting higher layer data and the method of reassembling the same proposed by the disclosure.

In the embodiment of reference numeral 1312, a transmitting side and a receiving side may define and use an S field 1337 of 2 bits. The S field may be defined for three cases among the four cases of 00, 01, 11, and 10 to indicate complete data that is not segmented, a segment other than a last segment (indicate that there is another segment), and the last segment. The one-to-one mapping between three values among 00, 01, 11, and 10 of the S field 1337 and the segments such as the complete data, the segment other than the last segment (or indication indicating that there is another segment), and the last segment may have 24 cases, and one thereof is defined in the disclosure. One remaining value of 00, 01, 11, and 10 may be reserved for another function in the future. For example, the S field 1337 may be defined as shown in [Table 10] below.

TABLE 10

| S field value | Meaning |
| --- | --- |
| 00 | Data field includes all pieces of data SEG SDU |
| 01 | Data field includes last segment of SEG SDU |
| 10 | Data field includes last segment of SEG SDU |
| 11 | Not used. Reserved. |

As illustrated in FIG. 11, since the newly defined layer device (SEG layer device 1110 or 1155) is defined and used above the PDCP layer device 1115 or 1150, when the reception RLC layer device operates in the AM, transmission of data without data loss is supported, and the reception PDCP layer device sequentially arranges the data according to the PDCP SN and transfers the data to the reception SDG layer device. However, when the reception RLC layer device operates in the UM and allows data loss or when data transmission between the RLC layer device and the PDCP layer device is configured wiredly or wirelessly due to implementation of the CU-DU split structure of the eNB and thus data loss is generated, the new layer device may need the SN, and only when the SN is used together with the S field of 2 bits, the transmitting side may segment the RRC message or data and the receiving side may successfully reassemble and receive the segmented data even though there is data loss.

The operation of the transmitting side according to the embodiment of reference numeral 1312 for the method of segmenting higher layer dater or the method of reassembling the same is described below.

- The new layer device divides data if the size of the RRC message or the data received from the higher layer device is larger than the maximum size supported by the PDCP layer device or a specific threshold value, and does not divide data if the size is not larger.
- In the embodiment of reference numeral 1312, when the SN is allocated, different SN are allocated to pieces of data (segments) segmented from the same higher layer data (SEG SDU). Accordingly, the SNs may indicate sequences of the respective segments, and the S field 1337 may indicate parts of the one data from which the segments are segmented. Therefore, even though four or more segments are segmented from the one same data and a second or third segment is lost, the receiving side may identify the lost second or third segment on the basis of the SN and detect whether the segment is lost.

When data segmentation is performed, different SNs are allocated to segments. In the case of a segment other than the last segmented data (segment), the S field 1337 of the new header is configured as 01, the header is added to the front of the segmented data, and the data is transmitted to a lower layer device. In the case of the last segmented data (segment), the S field 1337 of the new header is configured as 10, the header is added to the front of the last segmented data, and the data is transmitted to a higher layer device.

When data segmentation is not performed, the SN is allocated, the S field 1337 of the new header for data received form a higher layer is configured as 00, the header is added to the front of the data, and the data is transmitted to a lower layer device.

The operation of the receiving side according to the embodiment of reference numeral 1312 for the method of segmenting higher layer dater or the method of reassembling the same is described below.

When a new layer device is configured for a specific bearer (SRB or DRB) or when the method of segmenting data or reassembling the same proposed by the disclosure is configured, the new layer device of the receiving side reads a new header and identifies whether received data is segmented RRC messages or data or a non-segmented RRC message or data. It may be identified that SNs indicate sequences of different segments. Accordingly, if there is a gap between the SNs, it may be noted that there is data loss.

When the data is the non-segmented RRC message or data on the basis of the identification of the new header of the currently received data, the new header may be removed and the RRC message or data may be transmitted to a higher layer device. When the data is the segmented RRC message or data (segment), the SN and the S field 1337 of the new header may be identified and stored in a buffer. Then, when segments, which are not a last segment, and last segment are all received, the received segments may be reassembled, new headers of the segments may be removed to configure a complete RRC message or data, and the complete RRC message or data may be transmitted to a higher layer device. The reassembly procedure may be performed when all segments or one data (SEG SDU) are received on the basis of the SNs and the S field 1337. When the received segments are reassembled to be complete data and transmitted to the higher layer device, the complete data may be discarded from the buffer.

Reference numeral 1321 of FIG. 13B corresponds to another embodiment of the method of segmenting higher layer data and the method of reassembling the same proposed by the disclosure.

In the embodiment of reference numeral 1321, a transmitting side and a receiving side may define and use an S field 1339 of 1 bit. The S field 1339 may be defined for two cases of 0 and 1 to indicate complete data that is not segmented (or the last segment) and a segment other than the last segment (or indicate that there is another segment). The one-to-one mapping between two values of 0 and 1 of the S field 1339 and the segments such as the complete data that is not segmented (or the last segment) and the segment other than the last segment (or indication indicating that there is another segment) may have 2 cases, and one thereof is defined in the disclosure. For example, the S field 1339 may be defined as shown in [Table 11] below.

TABLE 11

| S field value | Meaning |
|---|---|
| 0 | Indicates all pieces of data of SEG SDU, last segment of SED SDU, or no segment of SEG SDU |
| 1 | Indicates segment other than last segment of SEG SDU or another segment of SEG SDU |

As illustrated in FIG. 11, since the newly defined layer device (SEG layer device 1110 or 1155) is defined and used above the PDCP layer device 1115 or 1150, when the reception RLC layer device operates in the AM, transmission of data without data loss is supported, and the reception PDCP layer device sequentially arranges the data according to the PDCP SN and transfers the data to the reception SDG layer device. However, when the reception RLC layer device operates in the UM and allows data loss or when data transmission between the RLC layer device and the PDCP layer device is configured wiredly or wirelessly due to implementation of the CU-DU split structure of the eNB and thus data loss is generated, the new layer device may need the SN, and only when the SN is used together with the S field 1339 of 1 bit, the transmitting side may segment the RRC message or data and the receiving side may successfully reassemble and receive the segmented data even though there is data loss.

The operation of the transmitting side according to the embodiment of reference numeral 1321 for the method of segmenting higher layer dater or the method of reassembling the same is described below.

The new layer device divides data if the size of the RRC message or the data received from the higher layer device is larger than the maximum size supported by the PDCP layer device or a specific threshold value, and does not divide data if the size is not larger.

In the embodiment of reference numeral 1321, when the SN is allocated, the same SN is allocated to pieces of data segments) segmented from the same higher layer data (SEG SDU). Accordingly, segments having the same SN may indicate that they are segmented from the same data. However, when the one same data is segmented into three or more segments and first or second segment is lost, the receiving side cannot identify the lost first or second segment or cannot detect whether segments are lost, and thus a reassembly error may occur. That is, reassembly may not be successful. Accordingly, when the number of segments is smaller than or equal to 2, the normal operation may be performed without any error. However, if the last segment is lost, data of which the last segment is lost and the following data cannot be reassembled since the S field 1339 has only the 1-bit indicator. Accordingly, the 1-bit indicator is useful only when the RLC layer device operating in the RLC AM has no loss.

When data segmentation is performed, the same SN is allocated to segments. In the case of a segment other than the last segmented data (segment), the S field 1339 of the new header is configured as 01, the header is added to the front of the segmented data, and the data is transmitted to a lower layer device. In the case of the last segmented data (segment) (or in the case of complete data that is not segmented), the S field 1339 of the new header is configured as 0, the header is added to the front of the last segmented data (or complete data that is not segmented), and the data is transmitted to a lower layer device.

When data segmentation is not performed, the SN is allocated, the S field 1339 of the new header for data received from a higher layer is configured as 0, the header is added to the front of the data, and the data is transmitted to a lower layer device.

The operation of the receiving side according to the embodiment of reference numeral 1321 for the method of segmenting higher layer dater or the method of reassembling the same is described below.

When a new layer device is configured for a specific bearer (SRB or DRB) or when the method of segmenting data or reassembling the same proposed by the disclosure is configured, the new layer device of the receiving side reads a new header and identifies whether information indicated by the header indicates the last segmented data (segment), the complete data that is not segmented, that there is no other segment, or that there is segmented data (segment) or another segment. It may be identified that segments having the same SN are segmented from one data.

When the S field 1339 of the new header of the currently received data indicates 0 (that is, indicates the last segmented data (segment), the complete data that is not segmented, or that there is no other segment), the data has the same SN as the currently received SN, and data of which the S field 1339 of the header is 1 is received, the data may be reassembled with the currently received data to configure complete data, new headers may be removed, and the complete data may be transmitted to a higher layer device.

When the S field 1339 of the new header of the currently received data indicates 0, the data has the same SN as the currently received SN, and there is no data of which the S field 1339 of the header is 1, that is, the S field 1339 of the header of the previously received data is 0, it may mean that the currently received data is complete data that is not segmented, and thus the new header may be removed and the complete data may be transmitted to a higher layer device.

When the S field 1339 of the new header of the currently received data indicates 1 (indicates the segmented data (segment) or that there is another segment), the new header of the data is identified, removed, and stored in a buffer until reassembly is performed or data of which the S field 1339 of the header is 0 arrives. When the received segments are reassembled to be complete data and transmitted to the higher layer device, the complete data may be discarded from the buffer.

Reference numeral 1322 of FIG. 13B corresponds to another embodiment of the method of segmenting higher layer data and the method of reassembling the same proposed by the disclosure.

In the embodiment of reference numeral 1322, a transmitting side and a receiving side may define and use an S field 1341 of 1 bit. The S field 1341 may be defined for two cases of 0 and 1 to indicate complete data that is not segmented (or the last segment) and a segment other than the last segment (or indicate that there is another segment). The one-to-one mapping between two values of 0 and 1 of the S field 1341 and the segments such as the complete data that is not segmented (or the last segment) and the segment other than the last segment (or indication indicating that there is another segment) may have 2 cases, and one thereof is defined in the disclosure. For example, the S field 1341 may be defined as shown in [Table 12] below.

TABLE 12

| S field value | Meaning |
|---|---|
| 0 | Indicates all pieces of data of SEG SDU, last segment of SED SDU, or no segment of SEG SDU |
| 1 | Indicates segment other than last segment of SEG SDU or another segment of SEG SDU |

As illustrated in FIG. 11, since the newly defined layer device (SEG layer device 1110 or 1155) is defined and used above the PDCP layer device 1115 or 1150, when the reception RLC layer device operates in the AM, transmission of data without data loss is supported, and the reception PDCP layer device sequentially arranges the data according to the PDCP SN and transfers the data to the reception SDG layer device. However, when the reception RLC layer device operates in the UM and allows data loss or when data transmission between the RLC layer device and the PDCP layer device is configured wiredly or wirelessly due to implementation of the CU-DU split structure of the eNB and thus data loss is generated, the new layer device may need the SN, and only when the SN is used together with the S field 1341 of 1 bit, the transmitting side may segment the RRC message or data and the receiving side may successfully reassemble and receive the segmented data even though there is data loss.

The operation of the transmitting side according to the embodiment of reference numeral 1322 for the method of segmenting higher layer dater or the method of reassembling the same is described below.

The new layer device divides data if the size of the RRC message or the data received from the higher layer device is larger than the maximum size supported by the PDCP layer device or a specific threshold value, and does not divide data if the size is not larger.

In the embodiment of reference numeral 1322, when the SN is allocated, different SN are allocated to pieces of data (segments) segmented from the same higher layer data (SEG SDU). Accordingly, the SNs may indicate sequences of the respective segments, and the S field 1341 may indicate parts of the one data from which the segments are segmented. Therefore, even though three or more segments are segmented from the one same data and a first or second segment is lost, the receiving side may identify the lost first or second segment on the basis of the SN and detect whether the segment is lost. However, if the last segment is lost, data of which the last segment is lost and the following data cannot be reassembled since the S field 1341 has only the 1-bit indicator. Accordingly, the 1-bit indicator is useful only when the RLC layer device operating in the RLC AM has no loss.

When data segmentation is performed, different SNs are allocated to segments. In the case of a segment other than the last segmented data (segment), the S field 1341 of the new header is configured as 1, the header is added to the front of the segmented data, and the data is transmitted to a lower layer device. In the case of the last segmented data (segment) (or in the case of complete data that is not segmented), the S field 1341 of the new header is configured as 0, the header is added to the front of the last segmented data (or complete data that is not segmented), and the data is transmitted to a lower layer device.

When data segmentation is not performed, the SN is allocated, the S field 1341 of the new header for data received from a higher layer is configured as 0, the header is added to the front of the data, and the data is transmitted to a lower layer device.

The operation of the receiving side according to the embodiment of reference numeral 1322 for the method of segmenting higher layer dater or the method of reassembling the same is described below.

When a new layer device is configured for a specific bearer (SRB or DRB) or when the method of segmenting data or reassembling the same proposed by the disclosure is configured, the new layer device of the receiving side reads a new header and identifies whether information indicated by the header indicates the last segmented data (segment), the complete data that is not segmented, that there is no other segment, or that there is segmented data (segment) or another segment. It may be identified that SNs indicate sequences of different segments. Accordingly, if there is a gap between the SNs, it may be noted that there is data loss.

When the S field 1341 of the new header of the currently received data indicates 0 (that is, indicate the last segmented data (segment), the complete data that is not segmented, or that there is no other segment), the currently received SN and the S field 1341 of the header are configured as 0, there is no SN gap between an SN smaller than the currently received SN and the largest SN in the data received up to now, and there is data (segment) of which the S field 1314 of the header is 1 between the largest SN and the currently received SN, the data may be reassembled with the currently received data according to a reception order to configure complete data, new headers may be removed, and the complete data may be transmitted to a higher layer device.

When the S field 1341 of the new header of the currently received data indicates 0, the currently received SN and the S field 1341 of the header are configured as 0, there is no SN gap between an SN smaller than the currently received SN and the largest SN in the data received up to now, and there is no data (segment) of which the S field 1314 of the header is 1 between the largest SN and the currently received SN, the new header of the currently received data may be removed and the complete data may be transmitted to a higher layer device.

When the S field 1341 of the new header of the currently received data indicates 1 (indicates the segmented data (segment) or that there is another segment), the new header of the data is identified, removed, and stored in a buffer until reassembly is performed or all segments of one data (SEG SDU) are received on the basis of the SNs and the S field 1341. The reassembly procedure may be performed when all segments or one data (SEG SDU) are received on the basis of the SNs and the S field 1341. When the received segments are reassembled to be complete data and transmitted to the higher layer device, the complete data may be discarded from the buffer.

When the method of segmenting higher layer data or the method of reassembling the same proposed by the disclosure is performed by the UE or the eNB, data segmentation may be performed in units of bytes, and thus the receiving side may easily reassemble the segmented data. When the transmitting side performs a procedure of segmenting data received from a higher layer device, the data having a size larger than a specific threshold value, the transmitting side may segment the data into segments having a fixed size or the same size, thereby facilitating processing of the receiving side. In another method, when the transmitting side performs a procedure of segmenting data received from a higher layer device, the data having a size larger than a specific threshold value, the transmitting side may segment the data into segments having variable sizes, thereby reducing header overhead. In another method, when the transmitting side performs a procedure of segmenting data received from a higher layer device, the data having a size larger than a specific threshold value, the size of segments to be segmented may be determined by UE implementation or network implementation. The specific threshold value may be set by the eNB through an RRC message.

When the method of segmenting higher layer data or the method of reassembling the same proposed by the disclosure is performed, an indicator may be defined in a header, and the defined indicator may indicate to discard all of the segments that are not reassembled in the previously received segments.

When a new layer device applies the method of segmenting higher layer data or the method of reassembling the same proposed by the disclosure, the new layer device may generate a new header and transfer the new header together with data received from a higher layer to a lower PDCP layer device.

At this time, the lower PDCP layer device may apply one of the following methods to perform a ciphering procedure or an integrity protection procedure on higher layer data.

Method 1: always ciphers a new header of a new layer device to segment or reassemble higher layer data for an SRB and a DRB for convenience of UE implementation. Further, an integrity protection procedure is always performed for the new header.

Method 2: do not cipher a new header of a new layer device to segment or reassemble higher layer data for an SRB and a DRB in order to read early information of the new header before deciphering by the receiving side. Further, an integrity protection procedure is always performed for the new header.

Method 3: always ciphers a new header of a new layer device to segment or reassemble higher layer data for an SRB for convenience of UE implementation. However, when an SDAP header is configured for a DRB, the SDAP header should not be ciphered and thus the new header is located in a PDCP header and an SDAP header, so ciphering may be performed unnecessarily twice and a ciphering procedure may be complicated. Accordingly, for the DRB, the new header of the new layer device for segmenting or reassembling higher layer data is not ciphered. Further, an integrity protection procedure is always performed for the new header.

Method 4: always ciphers a new header of a new layer device to segment or reassemble higher layer data for a DRB for convenience of UE implementation. However, in order to read early information of the new header before deciphering by the receiving side, the new header of the new layer device for segmenting or reassembling higher layer data is not ciphered for an SRB. Further, an integrity protection procedure is always performed for the new header.

The embodiments of FIG. 12, 13A, or 13B for the method of segmenting higher layer data or method of reassembling the same proposed by the disclosure may be applied to and used by other layer devices, for example, the RRC layer device, the SDAP layer device, the PDCP layer device, or the RLC layer device. When the embodiments are applied to another layer device, the new layer device may be interpreted as the other layer device in the above description. That is, the 2-bit indicator or the 1-bit indicator may be defined in a header of another layer device and the proposed embodiments may be applied to the other layer device. When an SN already exists, the embodiments may be applied using the SN. When there is no SN, a new SN of another layer device may be defined in a header, a 2-bit indicator or a 1-bit indicator may be defined, and the embodiments may be applied. When an indication of a length is needed, an L field indicating the length may be defined and used. When the embodiments are applied to another layer device, overhead may be reduced by using newly defined header fields (the SN, the 2-bit indicator, or the 1-bit indicator) may be used only when the method of segmenting higher layer data or the method reassembling the same is used, and defining and using a new indicator indicating whether there are newly defined header fields.

When the embodiments of FIG. 12, 13A, or 13B for the method of segmenting higher layer data or the method reassembling the same proposed by the disclosure are applied to the RRC layer device, the embodiments may be applied for each RRC message. For example, for RRC message having the size larger than the maximum data size supported by the PDCP layer device or a specific threshold value, the transmitting side may segment the RRC messages and the receiving side may reassemble the segmented RRC messages by defining a 1-bit indicator, a 2-bit indicator, or an SN within the RRC message through a non-critical extension method or a critical extension method and applying the proposed embodiments. Within the RRC messages, fields newly defined for the method of segmenting data or the method of reassembling the same may be located at the very front. In another method, within the RRC messages, fields newly defined for the method of segmenting data or the method of reassembling the same may be located at the end. In another method, a 1-bit field defined in the RRC message may have three meanings. For example, when there is no 1-bit field, it may mean no segmentation. The 1-bit field having a value of 0 (or 1) may indicate a segment other than the first segment and the last segment, and the 1-bit segment having a value of 1 (or 0) may indicate the last segment or that there is no more segmented data (segment). Further, when the RRC layer device applies the embodiments, additional fields may be defined to provide more accurate segmentation information. For example, an identifier for each RRC message, a segmented segment type, or an SN only for a segmented segment may be defined and used.

Figure 14:
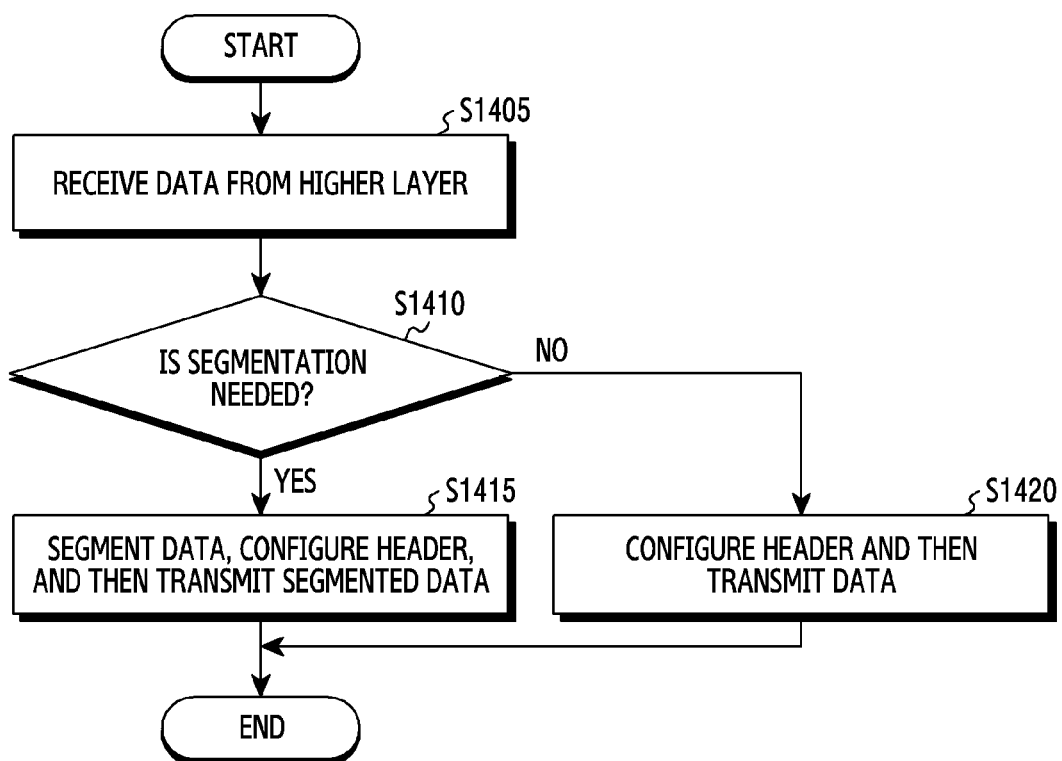
FIG. 14 illustrates the operation of the transmitting side of the UE for the method of segmenting higher layer data and the method of reassembling the same according to various embodiments of the disclosure.

FIG. 14 illustrates the operation of the transmitting side of the UE for an example of the method of segmenting higher layer data and the method of reassembling the same according to various embodiments of the disclosure.

The transmitting side of the UE or the SEG layer device of the transmitting side may receive an RRC message or data from a higher layer device in S1405 and determine whether the size of the received RRC message or data is needed to be segmented on the basis of the maximum size supported by the PDCP layer device or a specific threshold value (configured through the RRC message) in S1410. The data may be segmented in S1415 when the size is larger than the specific threshold value, and the data may not be segmented in S1420 when the size is not larger.

When data segmentation is performed, the transmitting side of the UE or the SEG layer device of the transmitting side may allocate SNs to the segments, configure S fields suitable for the segments, add headers, and transmit the segments to a lower layer device in S1415.

When data segmentation is not performed, the SEG layer device may allocate an SN to data received from the higher layer, add a header to the front of the data, and transmit the data to a lower layer device in S1420.

Figure 15:
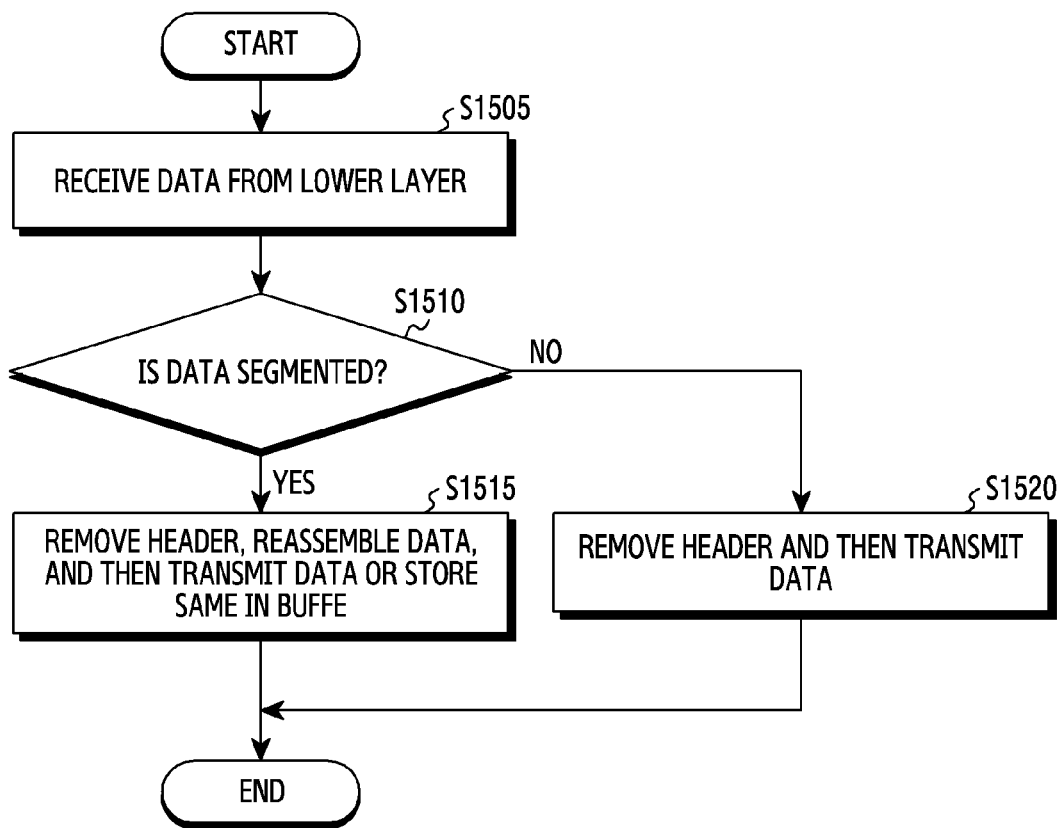
FIG. 15 illustrates an operation of a receiving side of the UE for an example of the method of segmenting higher layer data and the method of reassembling the same to which various embodiments of the disclosure can be applied.

FIG. 15 illustrates the operation of the receiving side of the UE for an example of the method of segmenting higher layer data and the method of reassembling the same to which various embodiments of the disclosure can be applied.

When a new layer device is configured for a specific bearer (SRB or DRB) or when the method of segmenting data or reassembling the same proposed by the disclosure is configured, the SEG layer device of the transmitting side or the receiving side of the UE receives data from a lower layer in S1505, reads a new header included in the received data, and identifies whether the received data is segmented RRC messages or data or a non-segmented RRC message or data in S1510.

The receiving side of the UE or the SEG layer device of the receiving side identifies a header of the currently received data and, when the data is an RRC message or data that is not segmented, remove the header and transmit the RRC message or data to a higher layer device in S1520.

When the data is a segmented RRC message or data (segment), the receiving side of the UE or the SEG layer device of the receiving side may identify an SN or an S field in a header of the received segment and store the SN or the S field in a buffer. When all segments of one data are received, the receiving side of the UE or the SEG layer device of the receiving side may reassemble the segments, remove headers of the segments, configure a complete RRC message or data, and transmit the complete RRC message or data to a higher layer device. When the received segments may be reassembled to be complete data and transmitted to the higher layer device, the segments may be discarded from the buffer in S1515.

Figure 16:
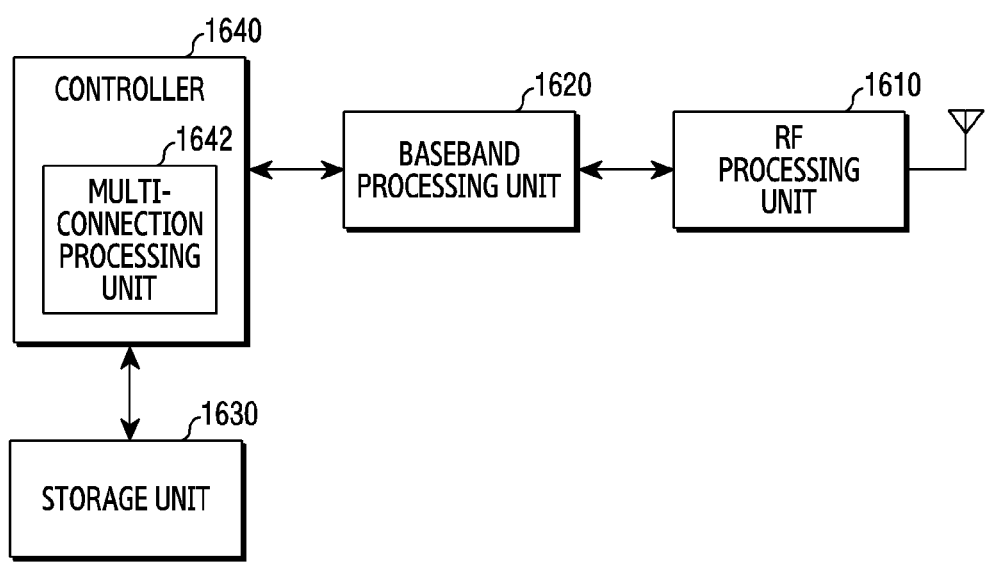
FIG. 16 illustrates an embodiment of the UE structure to which various embodiments of the disclosure can be applied.

FIG. 16 illustrates an embodiment of the UE structure to which various embodiments of the disclosure can be applied.

Referring to FIG. 16, a UE may include a Radio Frequency (RF) processing unit 1610, a baseband processing unit 1620, a storage unit 1630, and a controller 1640.

The RF processing unit 1610 performs a function of transmitting and receiving a signal through a radio channel such as converting or amplifying a band of the signal. The RF processing unit 1610 up-converts a baseband signal provided from the baseband processor 1620 into an RF band signal, transmits the RF band signal through an antenna, and then down-converts the RF band signal received through the antenna into a baseband signal. For example, the RF processing unit 1610 may include a transmission filter, a reception filter, an amplifier, a mixer, an oscillator, a Digital-to-Analog Convertor (DAC), an Analog-to-Digital Convertor (ADC), and the like. Although FIG. 16 illustrates only one antenna, the UE may include a plurality of antennas. The RF processing unit 1610 may include a plurality of RF chains. Moreover, the RF processing unit 1610 may perform beamforming. For the beamforming, the RF processing unit 1610 may control a phase and a size of each of the signals transmitted/received through a plurality of antennas or antenna elements. Further, the RF processing unit 1610 may perform Multiple-Input Multiple-Output (MIMO) and receive a plurality of layers during MIMO operation. The RF processing unit 1610 may perform reception beam sweeping by appropriately configuring a plurality of antennas or antenna elements under the control of the controller or may control a direction of a reception beam and a beam width so that the reception beam corresponds to a transmission beam.

The baseband processing unit 1620 performs a function of conversion between a baseband signal and a bitstream according to a physical layer standard of the system. For example, in data transmission, the baseband processing unit 1620 generates complex symbols by encoding or modulating a transmission bitstream. Further, in data reception, the baseband processing unit 1620 reconstructs a reception bitstream by demodulating or decoding a baseband signal provided from the RF processing unit 1610. For example, in an Orthogonal Frequency Division Multiplexing (OFDM) scheme, when data is transmitted, the baseband processing unit 1620 generates complex symbols by encoding and modulating a transmission bitstream, maps the complex symbols to subcarriers, and then configures OFDM symbols through an Inverse Fast Fourier Transform (IFFT) operation or a Cyclic Prefix (CP) insertion. Further, in data reception, the baseband processing unit 1620 divides the baseband signal provided from the RF processing unit 1610 in units of OFDM symbols, reconstructs the signals mapped to the subcarriers through a Fast Fourier Transform (FFT) operation, and then reconstructs a reception bitstream through demodulation and decoding.

The baseband processing unit 1620 or the RF processing unit 1610 transmits or receives a signal as described above. Accordingly, the baseband processing unit 1620 or the RF processing unit 1610 may be referred to as a transmitter, a receiver, a transceiver, or a communication unit. Further, at least one of the baseband processing unit 1620 or the RF processing unit 1610 may include a plurality of communication modules for supporting a plurality of different radio access technologies. In addition, at least one of the baseband processing unit 1620 or the RF processing unit 1610 may include different communication modules for processing signals of different frequency bands. For example, the different radio access technologies may include an LTE network and an NR network. Further, the different frequency bands may include a Super High Frequency (SHF) (for example, 2.5 GHz and 5 Ghz) band and a millimeter (mm) wave (for example, 60 GHz) band.

The storage unit 1630 may store data such as a basic program for the operation of the UE, an application, and configuration information. The storage unit 1630 may provide stored data according to a request from the controller 1640.

The controller 1640 controls the overall operation of the UE. For example, the controller 1640 transmits and receives a signal through the baseband processing unit 1620 or the RF processing unit 1610. Further, the controller 1640 may record data in the storage unit 1640 and read the data. To this end, the controller 1640 may include at least one processor. For example, the controller 1640 may include a Communication Processor (CP) that performs a control for communication, and an Application Processor (AP) that controls a higher layer such as an application program.

Figure 17:
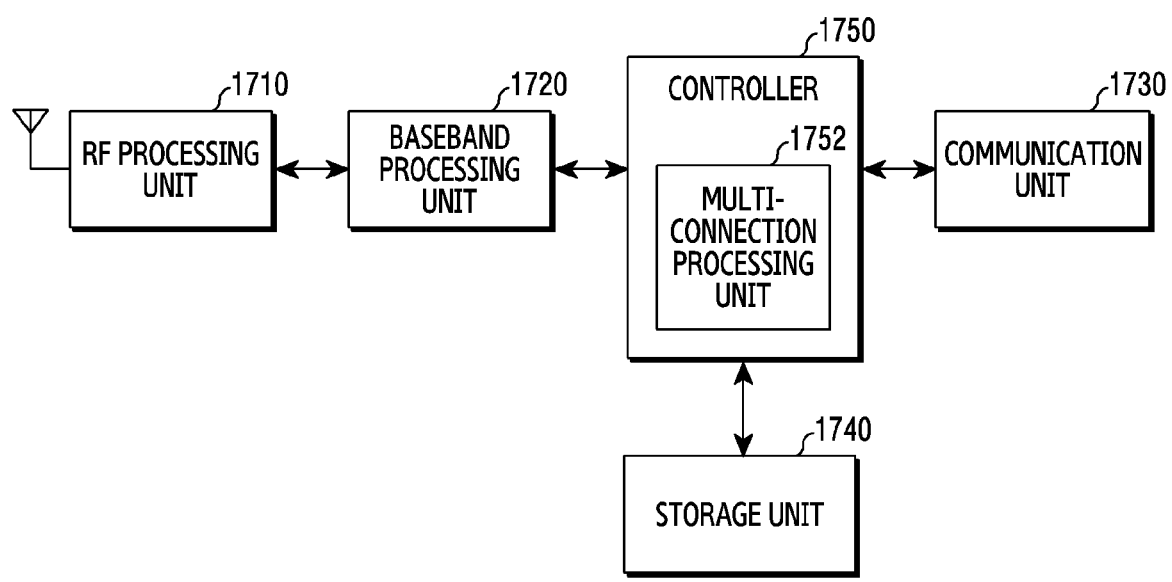
FIG. 17 is a block diagram illustrating an eNB in a wireless communication system to which various embodiments of the disclosure can be applied.

FIG. 17 is a block diagram illustrating an eNB in a wireless communication system to which various embodiments of the disclosure can be applied.

As illustrated in FIG. 17, the eNB may include an RF processing unit 1710, a baseband processing unit 1720, a backhaul communication unit 1730, a storage unit 1740, and a controller 1750.

The RF processing unit 1710 performs a function of transmitting and receiving a signal through a radio channel such as converting or amplifying a band of the signal. The RF processing unit 1710 up-converts a baseband signal provided from the baseband processor 1720 into an RF band signal, transmits the RF band signal through an antenna, and then down-converts the RF band signal received through the antenna into a baseband signal. For example, the RF processing unit 1710 may include a transmission filter, a reception filter, an amplifier, a mixer, an oscillator, a DAC, and an ADC. Although FIG. 17 illustrates only one antenna, the eNB may include a plurality of antennas. The RF processing unit 1710 may include a plurality of RF chains. The RF processing unit 1710 may perform beamforming. For the beamforming, the RF processing unit 1710 may control a phase or a size of each of the signals transmitted and received through a plurality of antennas or antenna elements. The RF processing unit may perform a downlink MIMO operation by transmitting one or more layers.

The baseband processing unit 1720 performs a function of performing conversion between a baseband signal and a bitstream according to a physical-layer standard of a first radio access technology. For example, in data transmission, the baseband processing unit 1720 generates complex symbols by encoding or modulating a transmission bitstream. Further, in data reception, the baseband processing unit 1720 reconstructs a reception bitstream by demodulating or decoding a baseband signal provided from the RF processing unit 1710. For example, in an OFDM scheme, when data is transmitted, the baseband processing unit 1720 may generate complex symbols by encoding and modulating the transmission bitstream, map the complex symbols to subcarriers, and then configure OFDM symbols through an IFFT operation and CP insertion. In addition, when data is received, the baseband processor 1720 divides a baseband signal provided from the RF processor 810 in units of OFDM symbols, reconstructs signals mapped with subcarriers through an FFT operation, and then reconstructs a reception a bitstream through demodulation and decoding. The baseband processing unit 1720 or the RF processing unit 1710 transmits or receives a signal as described above. Accordingly, the baseband processing unit 1720 or the RF processing unit 1710 may be referred to as a transmitter, a receiver, a transceiver, a communication unit, or a wireless communication unit.

The communication unit 1730 provides an interface for performing communication with other nodes within the network.

The storage unit 1740 may store data such as a basic program for the operation of the eNB, an application, and configuration information. Particularly, the storage unit 1740 may store information on a bearer allocated to the accessed UE and a measurement result reported from the accessed UE. Further, the storage unit 1740 may store information which is a reference for determining whether to provide multiple connections to the UE or stop the connections. The storage unit 1740 provides stored data according to a request from the controller 1750.

The controller 1750 may control the overall operation of the eNB. For example, the controller 1750 transmits and receives a signal through the baseband processing unit 1720, the RF processing unit 1710, or the backhaul communication unit 1730. Further, the controller 1750 may record data in the storage unit 1740 and read the data. To this end, the controller 1750 may include at least one processor.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE), the method comprising:
   determining whether a size of a UE capability information message exceeds a maximum packet data convergence protocol (PDCP) service data unit (SDU) size;
   when the size of the UE capability information message exceeds the maximum PDCP SDU size, performing a segmentation of the UE capability information message into a plurality of segments in a radio resource control (RRC) layer; and
   transmitting, to a base station (BS), messages for transmitting the plurality of segments of the UE capability information message,
   wherein each of the messages includes information on a segment number and information for a segment type.

2. The method of claim 1, further comprising:
   receiving, from the BS via a RRC signaling, a UE capability enquiry message including an indicator indicating that the segmentation of the UE capability information message is allowed,
   wherein the segmentation of the UE capability information message is performed based on the indicator.

3. The method of claim 1, further comprising:
   setting the segment number for a first segment of the plurality of segments to 0; and
   incrementing the segment number for each subsequent segment of the plurality of segments.

4. The method of claim 1,
   wherein the information for the segment type indicates whether a segment is a last segment of the plurality of segments or not.

5. The method of claim 1, wherein the messages for transmitting the plurality of segments of the UE capability information message are transmitted by transmitting to lower layers based on the segment number.

6. A user equipment (UE), the UE comprising:
   a transceiver; and
   at least one processor coupled with the transceiver, wherein the at least one processor configured to:
   determine whether a size of a UE capability information message exceeds a maximum packet data convergence protocol (PDCP) service data unit (SDU) size;
   when the size of the UE capability information message exceeds the maximum PDCP SDU size, perform a segmentation of the UE capability information message into a plurality of segments in a radio resource control (RRC) layer; and
   transmit, to a base station (BS), messages for transmitting the plurality of segments of the UE capability information message,
   wherein each of the messages includes information on a segment number and information for a segment type.

7. The UE of claim 6, wherein the at least one processor further configured to:
   receive, from the BS via a RRC signaling, a UE capability enquiry message including an indicator indicating that the segmentation of the UE capability information message is allowed,
   wherein the segmentation of the UE capability information message is performed based on the indicator.

8. The UE of claim 6, wherein the at least one processor further configured to:
   set the segment number for a first segment of the plurality of segments to 0; and
   incrementing the segment number for each subsequent segment of the plurality of segments.

9. The UE of claim 6, wherein the information for the segment type indicates whether a segment is a last segment of the plurality of segments or not.

10. The UE of claim 6, wherein the messages for transmitting the plurality of segments of the UE capability information message are transmitted by transmitting to lower layers based on the segment number.

11. A method performed by a base station (BS), the method comprising:
    receiving, from a user equipment (UE), messages for transmitting a plurality of segments of a UE capability information message,
    wherein a segmentation of the UE capability information message is performed in a radio resource control (RRC) layer when a size of the UE capability information message exceeds a maximum packet data convergence protocol (PDCP) service data unit (SDU) size,
    wherein each of the messages includes information on a segment number and information for a segment type.

12. The method of claim 11, further comprising:
transmitting, to the UE via a RRC signaling, a UE capability enquiry message including an indicator indicating that the segmentation of the UE capability information message is allowed,
wherein the segmentation of the UE capability information message is performed based on the indicator.

13. The method of claim 11, wherein the information for the segment type indicates whether a segment is a last segment of the plurality of segments or not.

14. The method of claim 11, wherein the messages for transmitting the plurality of segments of the UE capability information message are transmitted by transmitting to lower layers of the UE based on the segment number.

* * * * *